(12) United States Patent
Abedi

(10) Patent No.: US 8,023,898 B2
(45) Date of Patent: Sep. 20, 2011

(54) COMMUNICATION SYSTEMS

(75) Inventor: Saied Abedi, Reading (GB)

(73) Assignee: Fujitsu Limited, Kawasaki (JP)

( * ) Notice: Subject to any disclaimer, the term of this patent is extended or adjusted under 35 U.S.C. 154(b) by 448 days.

(21) Appl. No.: 12/314,841

(22) Filed: Dec. 17, 2008

(65) Prior Publication Data

US 2009/0190541 A1 Jul. 30, 2009

(30) Foreign Application Priority Data

Jan. 28, 2008 (GB) .................................. 0801536.4

(51) Int. Cl.
*H04B 1/00* (2006.01)

(52) U.S. Cl. ...................................... 455/63.1; 455/63.2

(58) Field of Classification Search .................. 455/63.1
See application file for complete search history.

(56) References Cited

U.S. PATENT DOCUMENTS

| 6,909,879 | B1 * | 6/2005 | Centore, III | 455/63.1 |
|---|---|---|---|---|
| 7,242,907 | B2 * | 7/2007 | Garrison et al. | 455/63.1 |
| 7,483,711 | B2 * | 1/2009 | Burchfiel | 455/522 |
| 2006/0083197 | A1 | 4/2006 | Kang | |
| 2006/0268791 | A1 | 11/2006 | Cheng et al. | |

FOREIGN PATENT DOCUMENTS

GB 2406479 3/2005

OTHER PUBLICATIONS

United Kingdom Search Report dated Mar. 20, 2008 for application No. GB0801536.4.

* cited by examiner

*Primary Examiner* — Hai L Nguyen
(74) *Attorney, Agent, or Firm* — Murphy & King, P.C.

(57) ABSTRACT

An interference mitigation method in a wireless network in which a plurality of nodes share an available frequency spectrum by performing wireless communication on sub-channels defined within the available spectrum. The nodes are grouped into clusters, each cluster having a leader of the cluster. Preferably, every node in the cluster is a transceiver equipped to act as leader and this leader role is rotated around the cluster.

18 Claims, 32 Drawing Sheets

Spectrum Co-existence and Sharing
On hours or couple of days basis

---

LT Spectrum Assignment
On one minutes or couple
of minutes basis

---

LT Spectrum Assignment
On one second or couple
of seconds basis

---

Channel Allocation/Radio Resource Partitioning
On 10 ms or below

M=4 out of P=16 Sub-Channels examined for minimum interference

COMMUNICATION SYSTEMS

FIELD OF THE INVENTION

The present invention relates to communication systems involving at least one wireless network. More particularly, the present invention concerns interference mitigation in wireless networks in which the network nodes (radio entities or transceivers) are organised into a plurality of groups or "clusters" for spectrum allocation purposes.

BACKGROUND OF THE INVENTION

In a wireless network, communication apparatuses of the network generally communicate (with one another, and/or with other communication apparatuses) using radio transmissions that share the same transmission medium. Although such radio transmissions are normally configured to occupy allocated or assigned frequency bands (also called sub-channels, and which may be divided in time to form "chunks"), the radio-frequency spectrum is nevertheless shared by such transmissions.

Radio transmissions occupying the same parts of the shared communication spectrum can interfere with one another. The level of interference will depend on a number of factors, for example on the power levels of the respective transmissions, and on the relative locations of the transmitters. In fact, many factors have an impact on interference.

Considering a wireless network comprising base stations (BSs) as an example, these factors include antenna orientation in the BSs, transmission schemes employed (say FDD or TDD) by the BSs, the nature of sectorisation within the cells of the BSs, the power control schemes employed, the handover schemes employed, the nature of traffic being handled by the BSs at each point in time, and the number of active subscribers (e.g. user equipment, or UEs) assigned to each BS at each point in time. Any smart antenna scheme employed in the BSs may also affect interference. Considering the impact of transmission power on interference, it is possible that a BS may be assigned a number of separate sub-channels that may use different transmission power levels. These different power levels can affect interference. Another important factor is the interference leakage between two adjacent sub-channels. Although in telecommunications systems the practical solution is to introduce guard bands to reduce such leakage, the arrangements of sub-channels assigned to a BS can nevertheless affect interference. Other important factors regarding interference may be, for example, surrounding atmospheric conditions and the presence or absence of obstructions to signal propagation. The effect of interference can be signal degradation and an overall drop in system performance as a whole, as compared to that in an "interference-free" system. It is therefore desirable to manage spectrum allocation to BSs within such a network, particularly among BSs located physically close to one another relative to other BSs. For this purpose, the concept of a "cluster" (see below) may be used to associate plural BSs in a network. BSs in a cluster are usually, but not always, in a single geographical region of the network.

Spectrum allocation within BSs of a cluster is a relatively small-scale and localised process, but it can be viewed as part of a hierarchy of spectrum allocation procedures with higher-level allocation being performed at network level and even at an inter-network level. This is particularly the case when a plurality of wireless networks co-exist, in other words operate at the same time in adjacent or overlapping geographical areas, and frequency spectra. Such multiple networks may be considered as parts of an overall or total wireless communication system in a geographical region of interest. Efforts are currently being made to improve the abilities of such multiple networks to co-exist and coordinate themselves; for example the so-called WINNER project.

The concept of a "gateway" used in WINNER is relevant to the invention to be described, and so the concept of co-existing networks will be briefly explained by way of background information.

FIG. 1 shows one way in which multiple networks can be coordinated. Here, an overall system is constituted by a number of wireless networks (here called Radio Access Networks or RANs) RAN1, RAN2 and RAN3 which each comprise a Gateway GW for the purpose of accessing the individual wireless network from a higher Core Network CN 6, typically via an IP Network. As proposed in WINNER for example, the GW is responsible for long-term spectrum assignment (see below) and for at least part of the radio resource management (RRM) in its own network. It is assumed that one GW is assigned for each wireless network.

Each wireless network may also comprise one or more Base Stations (BS) exemplified in the Figure by BS1, BS2, BS3, each of which is connected to at least one GW. Each such BS may transmit (and receive) radio signals to (and from) one or more User Equipments (UEs), within its geographical area of coverage (often referred to as a "cell"). UEs may also be referred to as user terminals (UTs), terminal equipments (TEs) or Mobile Stations (MSs). Since both base stations and user terminals are equipped to transmit and receive signals over one or more of the wireless networks, they are sometimes referred to below collectively as transceivers. As explained in more detail below, base stations and their UEs may be grouped into "clusters" extending over one or more adjacent or even non-adjacent cells, for spectrum allocation purposes.

Communications between the CN, GWs and BSs may be across wired communication links (e.g. via fiber-optic links) or across wireless communication links (e.g. across radio or microwave links). As indicated by arrows in FIG. 1, the GWs communicate among themselves, for example for the purpose of long-term (LT) spectrum assignment, as will be explained later. Meanwhile, the BSs communicate among themselves for, among other things, short term (ST) spectrum assignment as will also be explained below. Communications between the BSs and the UEs are typically across wireless links.

The CN may be distributed, for example across the IP network. The IP network may, for example, include the Internet. Although three networks (RANs) are shown in FIG. 1, the network may include any number of such RANs. Similarly, each wireless network may have any number of GWs, BSs and UEs. The UEs may be mobile and move from the cell of one BS to that of another BS, and even from one RAN to another RAN. The BSs may be dedicated to a particular wireless network, or may be shared between them on a temporary or non-temporary basis. One BS may for example serve two wireless networks at the same time. Although the wireless networks in FIG. 1 are made up of the same component apparatuses, they may employ different radio access technologies. Typically, different networks may be operated by different mobile-network operators. Different networks and BSs may have separate geographical areas of coverage, or may have partially or fully-overlapping areas of coverage. For example, one wireless network may effectively be co-located with another, perhaps by siting their respective base stations at the same sites or in the same housings.

The above is only one general type of wireless network. In this specification, the term wireless network also encompasses a wireless sensor network (WSN) in which the nodes are sensors of some kind, configured to at least act as transmitters (and sometimes also act as receivers). In such a network, an entity called a "sink" gathers information from the sensors, and has a role analogous to the base station of a wireless communication network. One special form of wireless sensor network is a so-called Body Area Network or BAN, in which sensors are placed at one or more positions on or in living bodies for the purpose of monitoring medical parameters or bodily activity. Two forms of BAN are MBAN or Medical BAN for use in hospitals and other health-related applications, and Wireless BAN or WBAN, this more general designation also extending to security applications for example.

The concept of "interference temperature" has been proposed for use in managing interference among network nodes such as clusters of BSs and/or UEs. This concept uses the fact that it is the interference level at the affected receiver, rather than at the transmitter causing the interference, which is important to determine the impact of a transmission on other networks. By limiting the total interference experience at a given receiver, it is possible to allow transmitters to operate in frequency bands (sub-channels or chunks) already allocated to other transmitters whilst protecting the receivers from undue interference. In practice, it is unrealistic to expect each transmitter to obtain the necessary information for estimating how their emissions would affect the interference temperature at a given receiver. Nevertheless, the concept of "interference temperature" is useful for classifying the level of interference experienced in particular frequency bands by receivers and groups (e.g. clusters) of receivers.

Given the potential for interference as already noted, interference management, also referred to below as interference mitigation, is essential for allowing efficient sharing and utilization of spectrum between BSs and clusters in wireless networks. However, there is a conflict between the desire for distributed management, permitting spectrum allocation to be rapidly varied in response to changing conditions, and the need for centralized management to ensure coordination among clusters and between networks.

SUMMARY OF THE INVENTION

According to a first aspect of the present invention, there is provided an interference mitigation method for use in a wireless network having a plurality of nodes grouped into a plurality of clusters, the wireless network having a frequency spectrum divisible into a plurality of sub-channels, the sub-channels capable of being allocated in any desired combination for used in wireless communication by the nodes; the method comprising the steps of:
  (a) selecting one of the clusters;
  (b) selecting one of the nodes in the selected cluster;
  (c) the selected node in the selected cluster finding a required number of sub-channels for its wireless communication;
  (d) the selected node monitoring the sub-channels to obtain a received interference level representing interference received from the other nodes on each of the sub-channels, and determining at least one combination of sub-channels in the required number based on the received interference level;
  (e) the selected node obtaining an inflicted interference level representing interference expected to be caused to the other nodes by its use of the combination of sub-channels;
  (f) the selected node deciding whether or not to adopt for its wireless communication the combination of sub-channels based on the received interference level and the inflicted interference level;
  (g) if there is another node in the selected cluster which has yet to be selected, returning to step (b) to select another one of the nodes; and
  (h) if all the nodes in the selected cluster have been selected, returning to step (a) to select another one of the clusters.

In the above method, step (e) may comprise the first node (which may be regarded as the temporary "leader" of the cluster) requesting other nodes in the cluster to provide information on interference they experience on the combination of sub-channels. To allow them to do this, step (e) may further involve the first node sending a test signal over the wireless network and the other nodes measuring interference caused by the test signal, to generate the information on interference they experience on the combination of sub-channels. The first node preferably notifies the other nodes in advance of sending the test signal. The other nodes may send the information on interference they experience individually to the selected node, and the selected node may obtain the inflicted interference level by collating this information.

Step (f) preferably comprises the first node deciding to adopt the combination of sub-channels based on whether the received interference level and inflicted interference level obtained in steps (d) and (e) are within a specified margin relative to a previously-stored received interference level and inflicted interference level, and if the combination of sub-channels is adopted, the selected node stores the newly-obtained received interference level and inflicted interference level in place of the previously-stored values.

Meanwhile, in step (c), if the required number of sub-channels does not exceed an existing number of sub-channels already being used by the selected node, steps (d) to (f) are preferably skipped and the selected node can adopt for its wireless communication a combination of the existing number of sub-channels or fewer.

In step (d), the currently-selected node preferably determines the combination of sub-channels by measuring the received interference level on a plurality of possible combinations of sub-channels of the required number and finding the combination which minimises the received interference level. This may involve measuring the received interference level on a plurality of possible combinations of sub-channels of the required number and ranking the possible combinations in order of least received interference level. Then, step (f) may be first performed with the highest ranked combination of sub-channels and further comprising, if the inflicted interference level with that combination is judged unacceptable, repeating steps (e) and (f) with the next-ranked combination. The selected node may measure the received interference level on a plurality of the combinations of sub-channels chosen at random, or it may measure the received interference level on all possible combinations of the sub-channels.

The method is preferably repeated at time intervals corresponding to a transmission cycle in the wireless network. Step (a) can comprise selecting one node in order of sequence numbers assigned to the nodes in the cluster, and step (g) can comprise incrementing the sequence number. The assignment of sequence numbers to the nodes may be varied after every transmission cycle.

A method embodying the present invention also addresses interference from outside the cluster. To this end, step (h) may further comprise determining an overall interference level in the cluster after all the nodes have been selected. Preferably, the overall interference level is determined by a leader node of the cluster (e.g. the above currently-selected or "first" node) which, if it determines that the overall interference level exceeds a first predetermined threshold, informs other clusters in the network of an interference-critical state. In doing so, the leader node may request the leader node of another cluster to merge their respective clusters and then perform the interference mitigation method on the basis of the merged cluster jointly. When each node in a cluster is assigned a sequence number, merging the clusters can be achieved by re-assigning the sequence numbers on the basis of the merged cluster and selecting one of the leader nodes in the clusters being merged as the leader of the merged cluster.

After merging clusters in the above way, the process according to the first aspect can be repeated on the enlarged cluster, improving the chance of reducing overall interference to a non-critical or "cold" level.

Thus, according to a second aspect of the present invention, there is provided an interference mitigation method in a wireless network in which a plurality of nodes share an available frequency spectrum by each performing wireless communication using one or more sub-channels defined within the available spectrum, the nodes being grouped into clusters, each cluster having a node designated as the leader of the cluster and associated nodes in communication with the leader, the method comprising:

the leader of each cluster monitoring an interference level in its cluster, the interference arising at least partly from nodes in the cluster using the same sub-channels;

if the interference level exceeds a predetermined first level in any cluster, the leader thereof requesting the leader of another cluster to merge their respective clusters for the purpose of reducing the interference level in the merged cluster below the first level; and if the interference level is below a predetermined second level in any cluster, the leader thereof dividing its cluster into two clusters and designating one of the associated transceivers as the leader of one of the divided clusters.

As just indicated, splitting of one cluster into two is also possible in a method embodying the present invention. The leader of a cluster, if it determines that the overall interference level determined in step (h) is below a second predetermined threshold, may instruct the other nodes in the cluster to divide into two or more split clusters, whereupon the interference mitigation method is performed on the basis of each split cluster individually.

On the other hand, the steps referred to above (the "first phase" of operation in the detailed description below), may not always suffice to reduce interference sufficiently. This leads to a second phase of operation being invoked. After performing the above method on the basis of the merged cluster, if the overall interference level still exceeds the first predetermined threshold, the leader node reports this fact to a network manager of the wireless network, whereupon the network manager performs a centralized sub-channel allocation procedure.

Thus, according to a third aspect of the present invention, there is provided an interference mitigation method in a wireless network in which a plurality of nodes share an available frequency spectrum by each performing wireless communication using one or more sub-channels allocated to them within the available spectrum, the nodes being grouped into clusters, each cluster having a node designated as the leader of the cluster and which is in communication with a network manager of the wireless network, the method comprising the steps of:

(a) the leader of each cluster monitoring an interference level in its cluster, the interference arising at least partly from nodes in the cluster using the same sub-channels for wireless communication;

(b) if the interference level exceeds a predetermined level in any the cluster, the leader thereof attempting to reduce the interference by communicating with the leader of one or more of the other clusters;

(c) if the interference level still exceeds the predetermined level after step (b), the leader requesting the network manager to perform a centralized interference mitigation process by coordinating sub-channel allocation in the clusters.

Here, step (b) may comprise the leader attempting to reduce the interference level by merging its cluster with another cluster, as mentioned above. However, if no suitable cluster exists for merging or if the result of merging the clusters does not reduce the interference level to the predetermined level or below, the leader proceeds to step (c).

Preferably, step (c) comprises steps of:

(c) (i) the network manager requesting information on a data requirement for wireless communication of each node in each cluster;

(c)(ii) the network manager obtaining a possible sub-channel allocation for each node based on its data requirement;

(c) (iii) the network manager combining the possible sub-channel allocations into a plurality of potential sub-channel combinations, estimating an interference level resulting from each such combination, and selecting the combination for which the estimated interference level is a minimum; and (c) (iv) the network manager informing the leaders of the selected combination of sub-channels.

Step (c) (iv) may be followed by the leaders conducting dynamic sub-channel allocation among the associated nodes on a short-term basis, using the selected combination of sub-channels as a starting point. Preferably, the centralized interference mitigation process performed by the network manager involves spectrum allocation on a longer time scale than the dynamic sub-channel allocation.

The information on a data requirement of each node comprises a buffer occupancy state of each node. Step (c) (i) may further comprise the network manager requesting information on a current transmission power level of each node, and may involve obtaining information on a path loss from each node to another. Information on a path loss can be obtained by measurement in advance and stored in a memory of the network manager. If some of the nodes are mobile step (c) (i) may further comprise the network manager obtaining information on a current location of the mobile nodes, for example by performing a time-difference-of-arrival calculation on such wireless signals. Alternatively, each mobile node has access to a positioning system for providing the information on its current location.

Each node may be in communication with the network manager and provides the requested information directly to the network manager; alternatively each node provides the requested information to the leader which informs the network manager of the requested information for its cluster. The nodes may be arranged to transmit signalling information over a wireless link, including but not necessarily the wireless network.

The "nodes" referred to above may be base stations or UEs, and the wireless network may be a cellular mobile communication system, for example a WINNER network in which a network manager in the form of a gateway performs long-term and short-term spectrum assignment, and in which each cluster performs a dynamic radio channel allocation process of assigning sub-channels to nodes on a time scale shorter than the long-term and short-term spectrum assignment.

Alternatively the wireless network is a wireless sensor network, including possibly a body area network in which the nodes include sensors acting at least as transmitters in the network. The wireless sensor network may include RFID devices as the nodes.

According to a fourth aspect of the present invention, there is provided a wireless network having a plurality of transceivers grouped into a plurality of clusters, the wireless network having a frequency spectrum divisible into a plurality of sub-channels, the sub-channels capable of being allocated in any desired combination for used in wireless communication by the transceivers; wherein the network includes selecting means for selecting, in turn, each of the clusters and each of the transceivers within each cluster, each transceiver being provided with control means operable for:
  (a) determining that the transceiver is a member of a currently-selected one of the clusters;
  (b) determining that the transceiver is a currently-selected one of the transceivers in the selected cluster;
  (c) finding a required number of sub-channels for its wireless communication;
  (d) monitoring the sub-channels to obtain a received interference level representing interference received from the other transceivers on each of the sub-channels, and determining at least one combination of sub-channels in the required number based on the received interference level;
  (e) obtaining an inflicted interference level representing interference expected to be caused to the other transceivers by its use of the combination of sub-channels; and
  (f) deciding whether or not to adopt for its wireless communication the combination of sub-channels based on the received interference level and the inflicted interference level.

According to a fifth aspect of the present invention, there is provided a wireless network in which a plurality of transceivers share an available frequency spectrum by each performing wireless communication using one or more sub-channels defined within the available spectrum, the transceivers being grouped into clusters, each cluster having a transceiver designated as the leader of the cluster and associated transceivers in communication with the leader, wherein each transceiver comprises:
  monitoring means responsive to the transceiver being designated as the leader to monitor an interference level in its own cluster, the interference arising at least partly from transceivers in the cluster using the same sub-channels;
  comparing means for comparing the interference level with a predetermined first level and a predetermined second level, and for, if the predetermined first level is exceeded, declaring an high-interference state of the cluster, and if the predetermined second level is not exceeded, declaring a low-interference state of the cluster; and
  signalling means responsive to the high-interference state to request the leader of another cluster to merge their respective clusters for the purpose of reducing the interference level in the merged cluster below the first level, and responsive to the low-interference state to request another transceiver of its own cluster to become leader of a new cluster de-merged from its own cluster.

According to a sixth aspect of the present invention, there is provided a wireless network in which a plurality of nodes share an available frequency spectrum by each performing wireless communication using one or more sub-channels allocated to them within the available spectrum, the nodes being grouped into clusters, each cluster having a node designated as the leader of the cluster and which is in communication with a network manager of the wireless network, wherein:
  the leader node in each cluster comprises monitoring means for monitoring an interference level in its cluster, the interference arising at least partly from nodes in the cluster using the same sub-channels for wireless communication; comparing means for comparing the interference level so monitored with a predetermined level; cluster coordination means for coordinating spectrum allocation with one or more of the other clusters if the comparing means determines that the cluster is in an interference state in which the monitored interference level exceeds the predetermined level; and requesting means for signalling the network manager to request centralized interference mitigation in the event that the coordination means fails to resolve the interference state; and
  the network manager comprises control means for performing a centralized interference mitigation process by coordinating sub-channel allocation among the clusters to resolve the interference state.

An additional aspect of the present invention is a network manager suitable for use in the above system.

In the above, the term "wireless network" is used to denote any kind of wireless communication system involving fixed or mobile nodes (typically transceivers, but possibly also including transmitters or receivers). An example of such a wireless network would be an OFDM-based system of the kind proposed in WINNER, in which spectrum assignment is made in terms of "chunks" each consisting of a rectangular space-time area that comprises a number of OFDM symbols and a number of adjacent subcarriers. In such a system, data transmissions occurs in time units of "frames" each containing a number of chunks. Another example would be the body area network or BAN mentioned above.

By "frequency spectrum" is meant radio frequencies or any other range of frequencies of electromagnetic radiation suitable for communication, for example, the radio frequency range of the electromagnetic spectrum. Additionally or alternatively, the nertwork may operate within a microwave frequency range, for example. At least part of the spectrum may be common or shared among the clusters of the network thus leading to the potential for interference.

By "sub-channel" is meant primarily a subdivision of the available frequency spectrum along the frequency axis; however, the division is usually made also on a time basis, and possibly also on a spatial basis (particularly where multiple antennas are employed). The term "sub-channel" is thus to be interpreted broadly as meaning any subdivision of the available radio resources in a wireless network.

The term "node" relates to wireless equipment which is capable of undertaking wireless communications within the network, or in other words any radio entity in the network. At a minimum, such a node should be capable of at least transmitting data to the network manager. Usually, the nodes will be transceivers capable of both receiving and transmitting information, and typically, they will be base stations in a mobile communication system.

Thus, another aspect of the present invention provides a transceiver for use in any of the methods defined above.

In another arrangement, a node may be an RFID device such as tag or a tag reader, or a sink or wireless sensor network base station. In a further arrangement—in a group of stationary or moving human or animal bodies constituting a system of BANs as mentioned above—the nodes may be sensors on or in a particular body being monitored, each such body typically having its own BAN.

When the nodes of the above aspects are base stations, these sub-allocate resources to any user terminals which may be connected to them, and such sub-allocation may proceed independently of the present invention. However, the term "node" may also relate to the user terminals themselves, for example a mobile telephone, personal digital assistant, laptop or PC, to an RFID tag/node or wireless sensor node, where these have sufficient functionality to communicate directly with the network manager.

The term "network manager" covers any supervisory entity in a network, for example a gateway (GW) as proposed in WINNER. Usually, only one network manager will be provided; however, very wide-scale networks (for example networks with a footprint extending over national boundaries) may have multiple managers.

In a further aspect, there is provided software which, when executed by one or more networked processors, provides the above-defined network manager or transceiver (e.g., BS or UE). The software may be recorded on a computer-readable medium.

BRIEF DESCRIPTION OF THE DRAWINGS

Reference will now be made, by way of example, to the accompanying drawings, in which.

DETAILED DESCRIPTION

Figure 1:
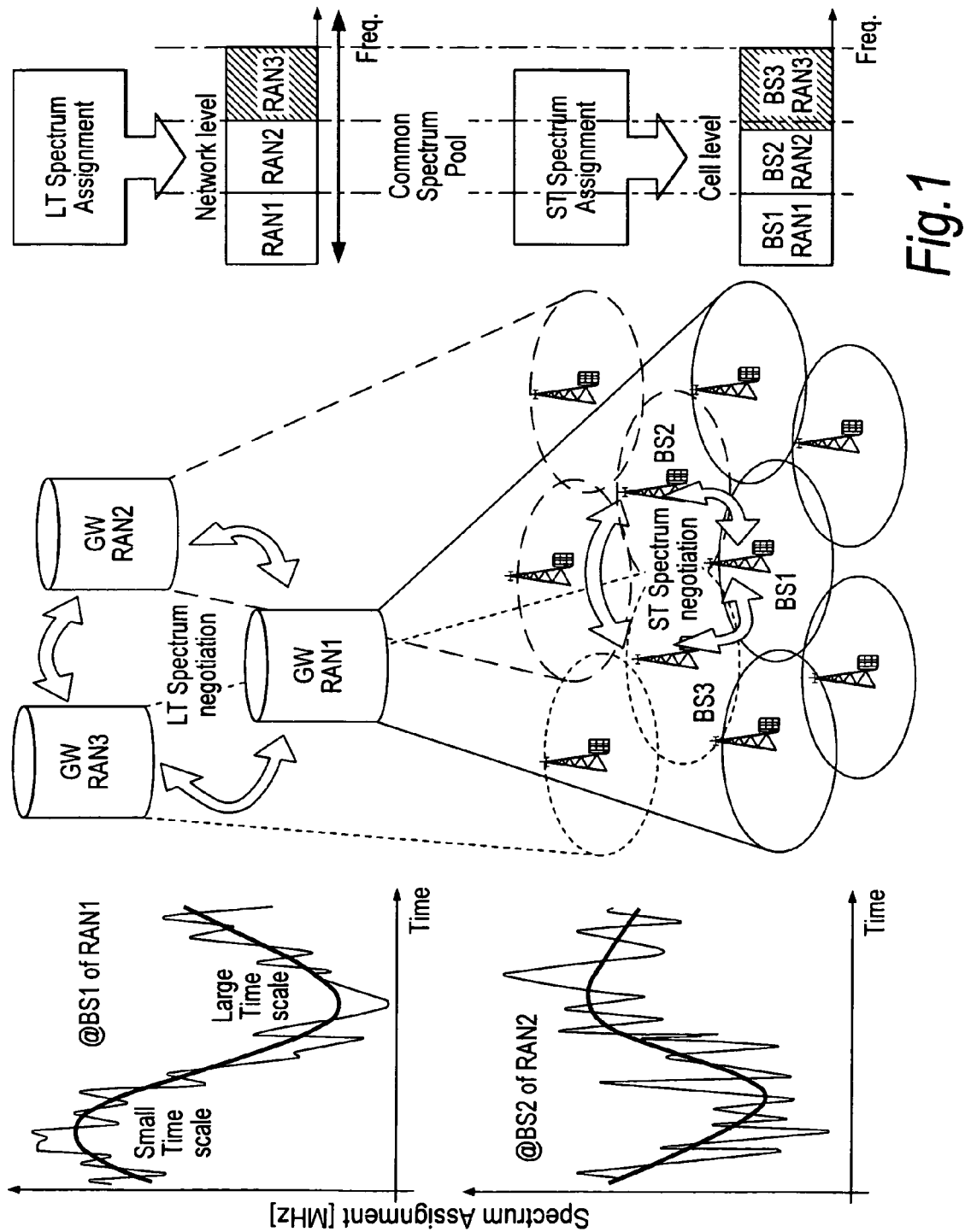
FIG. 1 illustrates LT and ST spectrum assignment in a system encompassing multiple RANs.

Efficient interference control in a modern wireless network is a key enabling technology contributing to a better QoS across the network. Distributed interference control and distributed dynamic channel allocation in a radio network has certain advantages when compared to a centralized approach including a lower delay, no need for an expensive higher and central decision making entity, and eliminating extra expensive signalling overhead from low layer radio entities to higher decision maker entities. The problem with a distributed approach is that in highly loaded scenarios, when traffic demand is high across the radio network, many conflicts of interest are inevitable, as the distributed entities make sub-channel allocation decisions without necessarily being aware of the decisions being made by other radio entities. As a result, some radio sub-channels may become overloaded and suffer from severe interference and drop of packet data, leading to an unacceptable QoS for the wireless network.

In view of this problem, the present invention allows for sub-channel allocation to individual radio entities (usually transceivers, such as the BS or UEs of a wireless communication system) to be performed in two distinct ways or phases. A first phase is a distributed approach, involving fast and dynamic distributed or semi-distributed interference management and radio channel allocation at a local or cluster level.

Despite its advantages occasionally it would be possible that on some occasions the distributed approach is unable to handle heavily loaded situations, where some specific channels are in great demand. In such situations, settling conflict may not be possible without involving a centralized entity. Provided that a fast interface between lower radio entities and a centralized entity is available, it may be possible for the centralized entity to intervene without unduly delaying the dynamic channel allocation process, which typically takes place on timescales of millisecond order.

Thus, the present invention also provides a second phase which is a more centralized approach, involving coordination by the centralized entity (network manager or "gateway") that occasionally assists the distributed dynamic interference cancellation and channel allocation process. Preferably, both phases are carried out as needed, although either phase may be adopted by itself if preferred.

Before describing the above phases in detail, some background explanation will be given regarding spectrum allocation in wireless networks. To appreciate the time scales involved, refer back to FIG. 1. As indicated here, spectrum sharing can take place at the network or gateway level and/or at the cell or base-station level. These types or modes of spectrum sharing are called long-term spectrum assignment (LT assignment) and short-term spectrum assignment (ST assignment) respectively. Spectrum sharing may be used to periodically reassign a portion of the available spectral resources between different wireless networks. In contrast to fixed-spectrum assignment, spectrum sharing can enable dynamic balancing of spectral resources between networks. As a result, the spectral scalability of networks can be increased, and spectral resources available for a network can be adjusted according to changes in requirements.

It is desirable that any spectrum-sharing scheme provides a communication network with stable, predictable and reliable access to the spectrum, whilst also reacting quickly to changing spectrum requirements between different parts (e.g. clusters) of the system. By dividing spectrum sharing into LT spectrum assignment (providing slowly varying, stable spectrum assignments for large geographical areas) and ST spectrum assignment (providing short-term modifications of the large-scale solution), the stability and predictability required can be achieved with reasonable complexity.

FIG. 1 illustrates conceptually how LT and ST spectrum assignment may take place. Here, BS1 from RAN1, BS2 from RAN2 and BS3 from RAN3 are engaged in ST spectrum negotiations. It is assumed that the spectrum chunk (or other allocation) being exchanged is part of a shared common pool of spectrum. It is also the assumption that unlike each wireless network's dedicated spectrum band, none of the wireless networks has a priority in using the common pool. FIG. 1 (right-hand side) shows an example in which ST spectrum assignment leads to RAN3 taking part of the common pool, assigned in LT spectrum assignment to RAN2, away from RAN2.

Figure 2:
FIG. 2 shows a hierarchical structure of four stages for spectrum negotiations and management.
Figure 2:
Figure 2:
Figure 2:

Based on the above, four stages for spectrum negotiations and management, also referred to below as spectrum functionalities, have been proposed as shown in FIG. 2. Not all four stages need be performed in every case, and any combination of those stages may be performed concurrently or in an ordered fashion.

The first stage may be referred to as "spectrum co-existence and sharing". In this first stage, wireless networks (for example belonging to different operators) may decide upon an amount of shared spectrum that is to be made available to one of those RANs beyond its existing dedicated spectrum band. The decision regarding the precise final boundaries of spectrum may be location dependent, depending for example on the nature of the area (e.g. metropolitan area, or local area) and on the coordinates of the area. A trade-off between spatial separation and frequency separation may also affect the precise final boundaries of assigned spectrum.

The second stage shown in FIG. 2 is the long-term (LT) spectrum assignment mentioned earlier. After making decisions about spectrum boundaries in stage 1, negotiations can occur between the GWs of different wireless networks (for example, belonging to different operators) on a regular or semi-regular basis, for example every couple of minutes. Such negotiations can serve to rearrange (re-allocate, or re-assign) the available spectrum to ideally maximize spectrum utilization between the different wireless networks. In this way, one RAN operator can trade in unused spectrum to maximize revenue from its own unused spectrum and improve QoS to its own subscribers by obtaining unused spectrum from other operators.

The third stage is the short-term (ST) spectrum assignment referred to above. After making decisions about spectrum-allocation boundaries in stage 2, negotiations can occur locally between BSs on a short-term regular or semi-regular basis, for example every few seconds. It will be appreciated that the purpose of such short-term assignment in stage 3 is to augment the scheduled long-term assignment of stage 2 by allowing for faster spectrum assignments and, thus, increasing overall flexibility. Such short-term assignment can operate with the spatial granularity of a cell.

Figure 3:
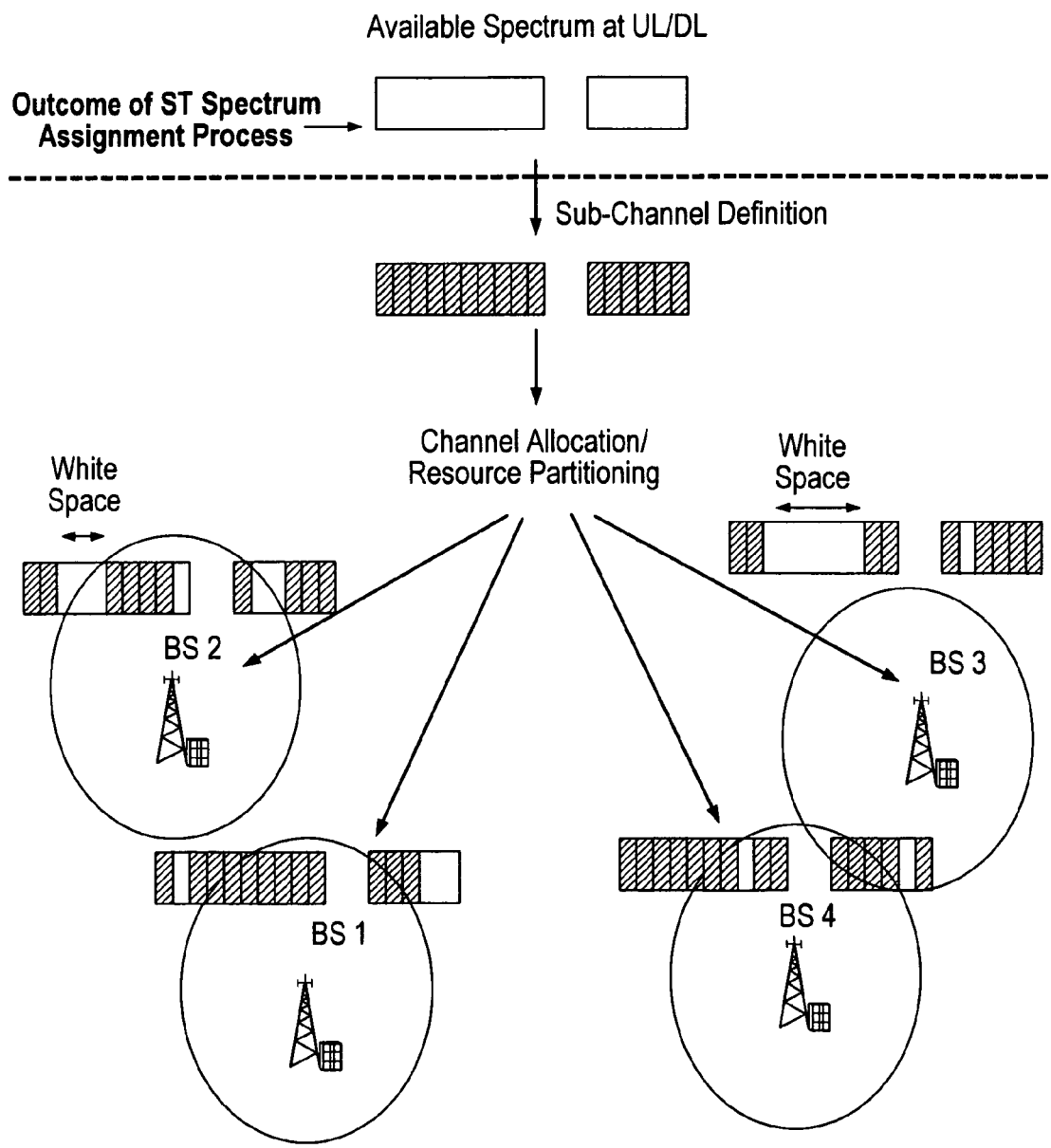
FIG. 3 is a schematic diagram showing dynamic channel allocation and interference mitigation at a cell level.

The fourth stage may be referred to as channel allocation/radio-resource partitioning. This stage decides which sub-channel should be allocated to which radio entity, and can be performed either in distributed manner (e.g. by the base stations) or centralized manner (by the GW). After a decision is reached in the third stage (i.e. on a short-term (ST) basis), decisions can be made in the fourth stage to allocate suitable sub-channels to each cell or base station on an extremely short-term basis, for example every couple of tens of milliseconds. This is shown schematically in FIG. 3. The outcome of the ST assignment is depicted as blocks of spectrum which are available to be freely allocated on an individual sub-channel basis to the network nodes (BSs in this example). Under existing proposals, this channel allocation can be performed on a centralized or distributed basis. The words "White Space" in FIG. 3 refer to parts of the available frequency spectrum which (at least within a defined time period and region of space) are currently unused and thus potentially available to be allocated to other nodes.

The time granularity of the above four stages or spectrum functionalities is shown in FIG. 2. While the three stages of Spectrum Sharing and Coexistence, LT Spectrum Assignment and ST Spectrum Assignment are responsible for defining the amount of spectrum available in the common spectrum pool and shaping the boundaries of spectrum over longer time scales, dynamic channel allocation divides the final available spectrum decided by ST Spectrum Assignment (e.g. just borrowed from another cell) into radio sub-channels and decides which radio sub-channel would be allocated to which radio entity on a fast millisecond timescale, in response to radio channel and traffic variation. The present invention is primarily concerned with this fourth stage of spectrum allocation, although the methods to be described may also influence the higher-level stages.

Figure 4:
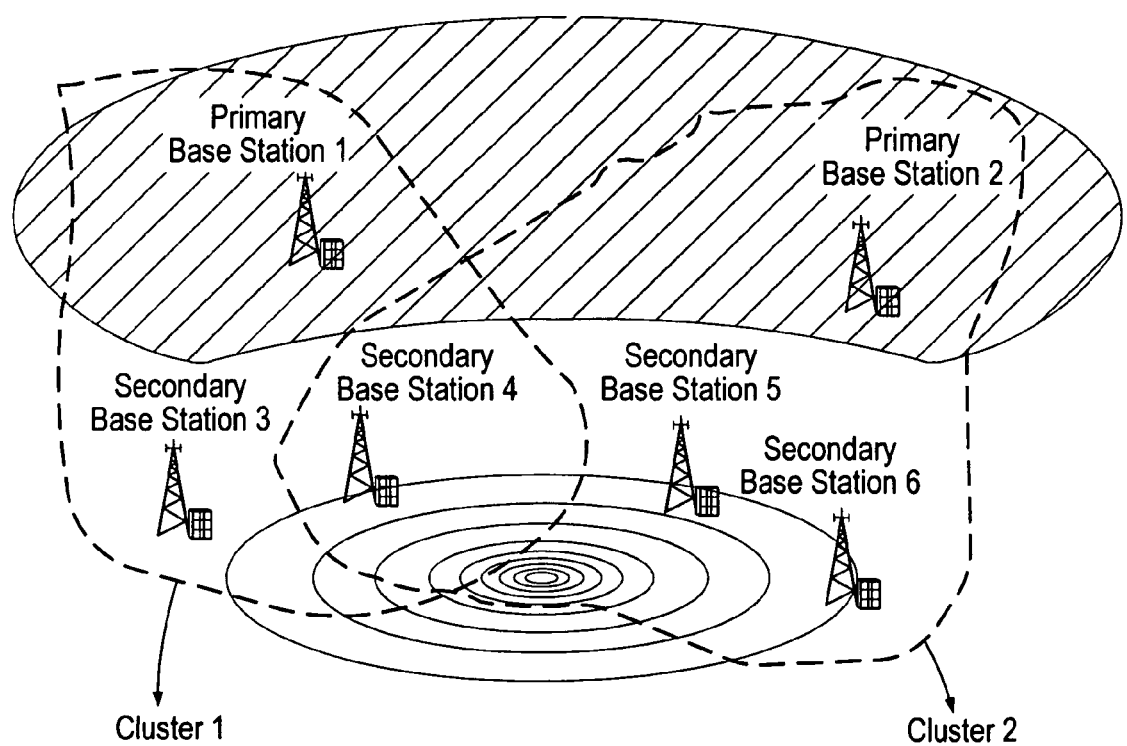
FIG. 4 illustrates how BSs may be organised into clusters for the purpose of spectrum assignment.

Next, some explanation will be given of the concept of "clusters" by referring to FIG. 4. FIG. 4 shows a Cluster 1 having a lead or primary BS 1 along with other or secondary BSs 3 and 4. In addition a Cluster 2 has a Primary BS 2 together with secondary BS 5 and 6 and, in common with Cluster 1, includes Secondary BS 4. Thus, as shown it is possible for one BS to belong to more than one cluster or wireless network at the same time. Since each BS in a wireless network typically has its own cells, this means that a cluster will normally cover more than one cell. Part of the methods to be described focus on interactions between clusters, and interactions between members of a cluster. As will become apparent, the clusters are not fixed but rather (especially in a first phase to be described) dynamically changing over time, for example as BSs (nodes) leave or join.

Embodiments of the present invention use the concept of a cluster "leader", namely a BS (or UE) which is, even if only for a short time, designated as having some overall responsibility for the cluster. This may include, for example, responsibility for communications between the cluster and a central entity such as a network manager or gateway. In FIG. 4, Primary BS1 and Primary BS2 may be the leaders of their respective clusters. However, the concept of "leader" and of Primary/Secondary relationships may be purely notional; for example, the status of nodes within the cluster may be rotated at fixed time intervals so that every node takes a turn as the leader.

In the following description, reference will be made to "red" and "cold" clusters and sub-channels. These terms relate to the concept of interference temperature as mentioned above. A red cluster is one which, or more correctly the nodes of which, experience (at least within a given frequency band and time duration) an unacceptably high level of interference. A cold cluster is one for which the interference level experienced at its nodes is acceptable. Clusters in the network which suffer interference are also referred to below as "troubled". Although there are various sources of interference in a wireless network as mentioned above, one major source of interference which will be focussed on is that arising when two or modes in relatively close proximity are using (some of) the same sub-channel at a given time period. In the context of clusters, this allows two types of interference to be defined: "internal" interference inflicted by the cluster nodes on one another; and "external" interference inflicted from nodes in other clusters.

The first phase of operation explained below is aimed partly at mitigating such internal interference by co-ordinating the nodes within a cluster, and if need be by enlarging the cluster to ameliorate sub-channel conflicts between clusters. The second phase, as already mentioned, is one in which a central entity coordinates spectrum allocation at the network level.

Some theoretical discussion of interference among transceivers in a wireless network will now be given. The following discussion is applicable to both the first and second phases to be described.

Figure 5:
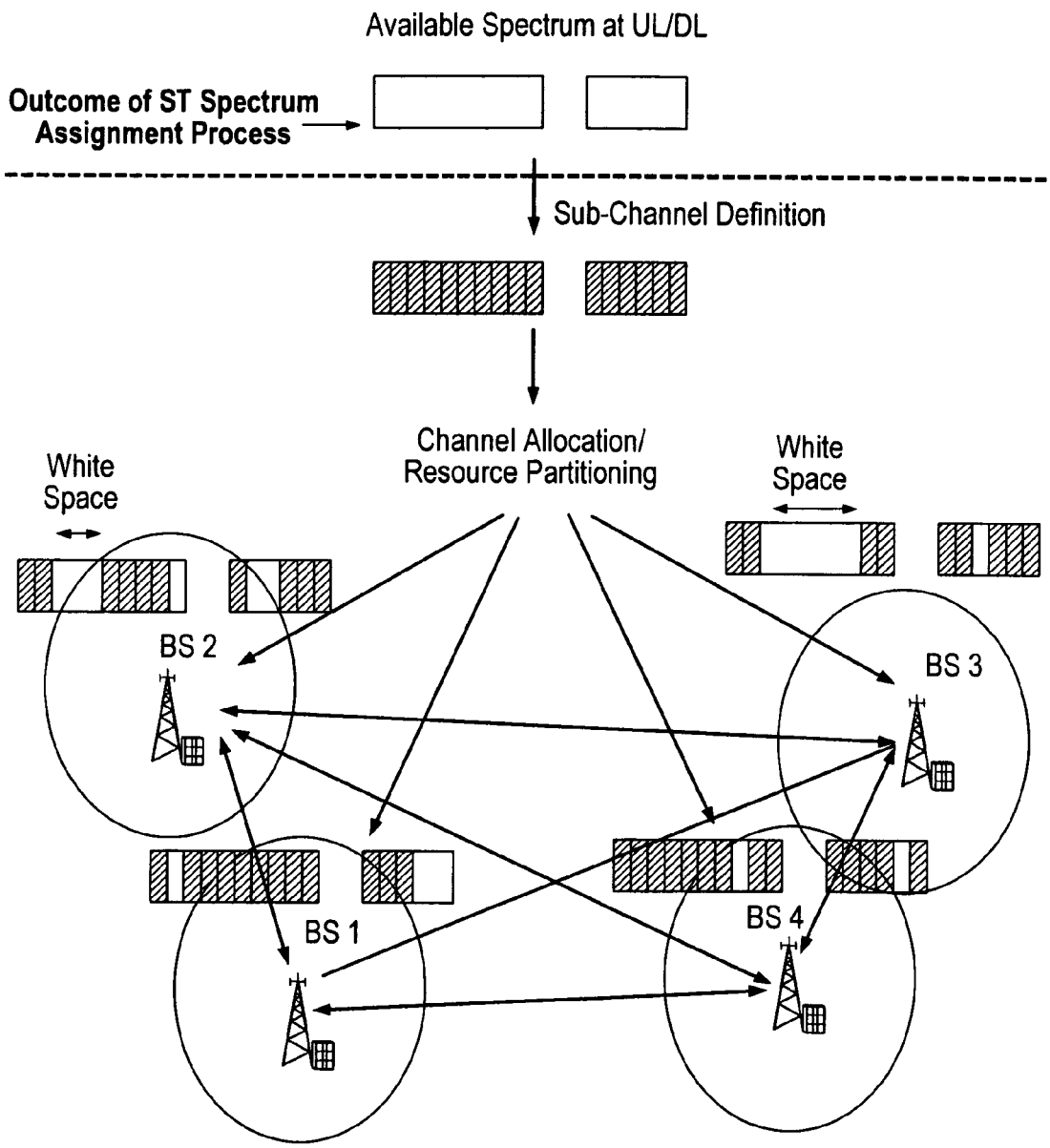
FIG. 5 shows an example of a first phase of a method embodying the present invention, involving distributed sub-channel allocation by BSs acting as nodes of a network.

We assume that a network of nodes consists of J transceiver nodes, either fixed or mobile, and distributed uniformly in a square region of dimension L×L. It is assumed that these radio transceivers are capable of direct communications to each other as shown in FIG. 5 (where the transceivers are BSs) and FIG. 6 (where they are UEs). Their communications may take place either Over the Air (OTA) or over an IP link connecting them to each other. The communications can also be realised through other means such as Ultra Wide Band (UWB).

We further assume that the transceivers have the capability to listen to the sub-channels and measure the interference receiver from other transceivers on each radio sub-band. It is further assumed that the radio sub-channels are shared between the transceivers and if the two transceivers choose the same radio sub-channel it will have some impact on both depending on the radio channel between them.

Within the J nodes, we assume that N transceivers form a cluster and that each cluster of BS (or UEs when transceivers are UEs) has an assigned leader. Assignment of sequence numbers to the cluster members is performed by the leader BS (or the leader UE transceiver in the UE case) and updated every time a transceiver stops transmission in BS case (or leaves the cluster in UEs case). The numbering is such that leader BS always get the highest sequence number. The leader BS (or leader UE in the UE case) informs the other cluster members of their new sequence numbers. Finally, it is assumed that the overall available spectrum has been divided into P sub channels, and that each transceiver might transmit at any instant (in any predetermined unit of time) in M sub-channels so that M<P.

The interactions between the involved transceivers can be characterised by the following interference function:

$$\omega(i,j,S_m)=1 \text{ if transceivers } i \text{ and } j \text{ are both transmitting} \\ \text{over the } m\text{-th sub-channel } S_m \text{ else } \omega(i,j,S_m)=0 \quad (1)$$

The interference from transceiver i on j on radio sub-channel $S_m$ is assumed to be:

$$I_{ijm}=p_i\eta_{ij}\omega(i,j,S_m) \text{ where } m=1\ldots M \quad (2)$$

where M is the number of radio sub-channels, $p_i$ is the transmission power associated with transceiver i and $\eta_{ij}$ is the overall transmission gain associated with the link from the transceiver i and transceiver j. In a similar way the interference from between transceiver i and transceiver j is expressed as:

$$I_{jim}=p_j\eta_{ji}\omega(j,i,S_m) \text{ where } m=1\ldots M \quad (3)$$

The overall interference $\gamma_i$ received from all the other transceivers can be determined as:

$$\gamma_i = \sum_{j=1,j\neq i}^{N} \sum_{m=1}^{M} I_{jim} \quad (4)$$

The overall interference $\beta_i$ inflicted by transceiver i on the other transceivers can be determined as:

$$\beta_i = \sum_{j=1,i\neq j}^{N} \sum_{m=1}^{M} I_{ijm} \quad (5)$$

The total interference inflicted on all the transceivers within a cluster can be expressed as:

$$\theta = \sum_{i=1,i\neq j}^{N} \sum_{j=1,i\neq j}^{N} \sum_{m=1}^{M} I_{ijm} \quad (6)$$

The total traffic load handled by a transceiver can be expressed as:

$$\alpha_i = \sum_{k=1}^{K} d_{ki} \quad (7)$$

where $d_{ki}$ is the amount of data currently residing in the k th buffer of the i th base station.

The first phase of a method embodying the present invention will now be described. In this phase, although the cluster members are primarily concerned about the interference from or on other cluster members, they may also consider the interference from outside the cluster. In the first phase, the transceivers in the cluster preferably take turns to consider interference they experience and may inflict on others, as follows. Each transceiver in the cluster is assigned with a sequence number. The following sequence of steps can be performed.

Step 1: The process starts with the transceiver with sequential order one.

Step 2: The transceiver (sequence number 1) determines $\alpha_i$ or the total data currently waiting in its buffers to be transmitted.

Step 3: The transceiver then maps the amount of data $\alpha_i$ to a minimum number of required sub-channels M.

Step 4: If this number is below the number of currently occupied sub-channels, the transceiver adopts the new lower number of sub-channels as M for its subsequent transmission. If it is equal to the number of currently occupied sub-channels, the same number of sub-channels stands. If it is above the number of currently occupied sub-channels, the new number is adopted as number of sub-channels.

Figure 7:
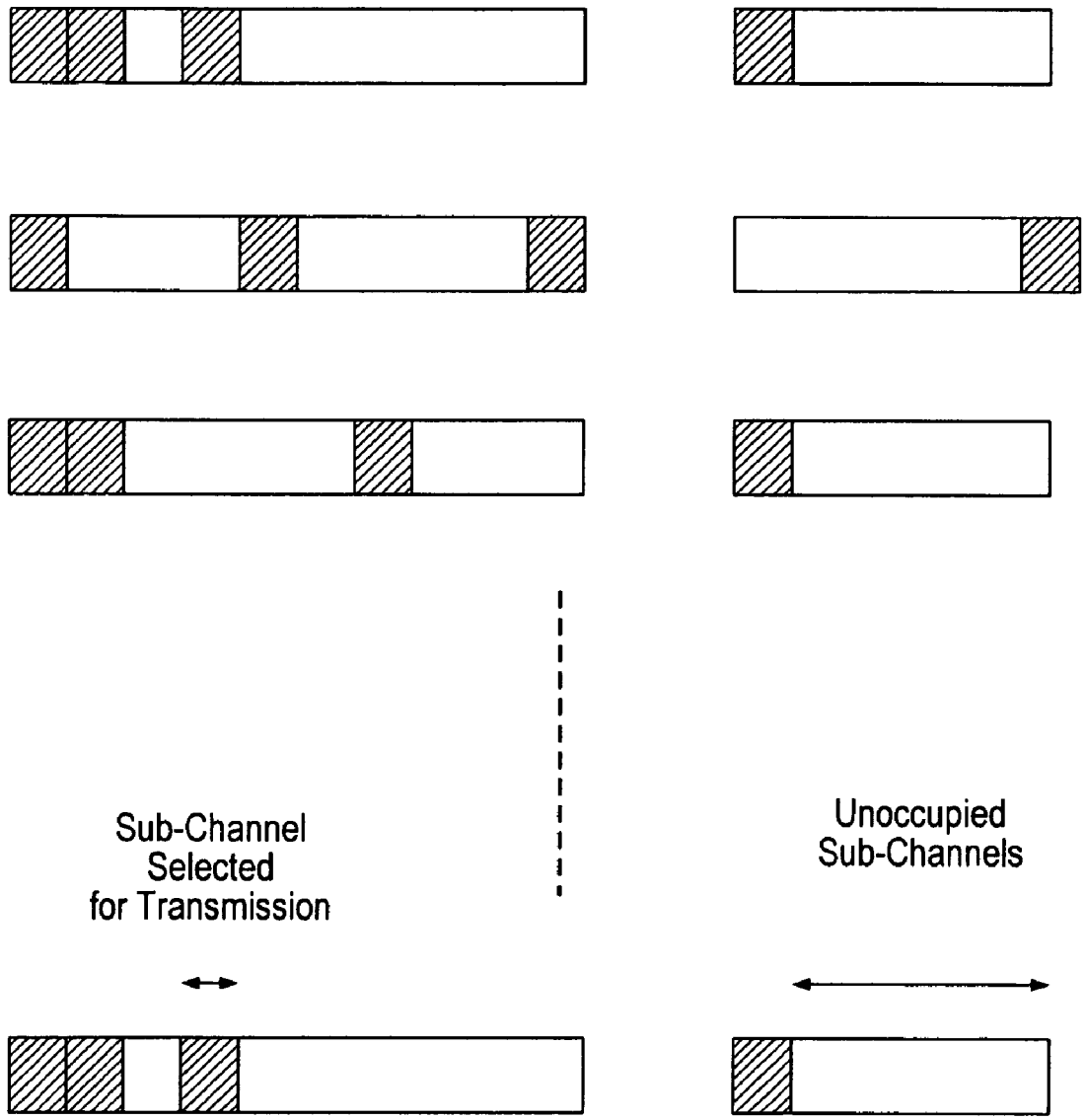
FIG. 7 illustrates a process of examining sub-channel for interference.

Step 5: For the new number of sub-channels, the transceiver currently selected listens (i.e. measures the current level of interference) to some say G random or deterministic possible combinations of M out of the overall available P sub-channels as shown in FIG. 7, to find out if the combination of M sub-channels out of P sub-channels that minimises $\gamma_i$ the overall interference received from other transceivers.

If the number of sub-channels are not too high, one possibility is to listen to all the channels, choose the M sub-channels with minimum interference first and then try the best say H number of combinations of sub-channels which are ranked in terms of the interference they receive in increasing order.

Figure 6:
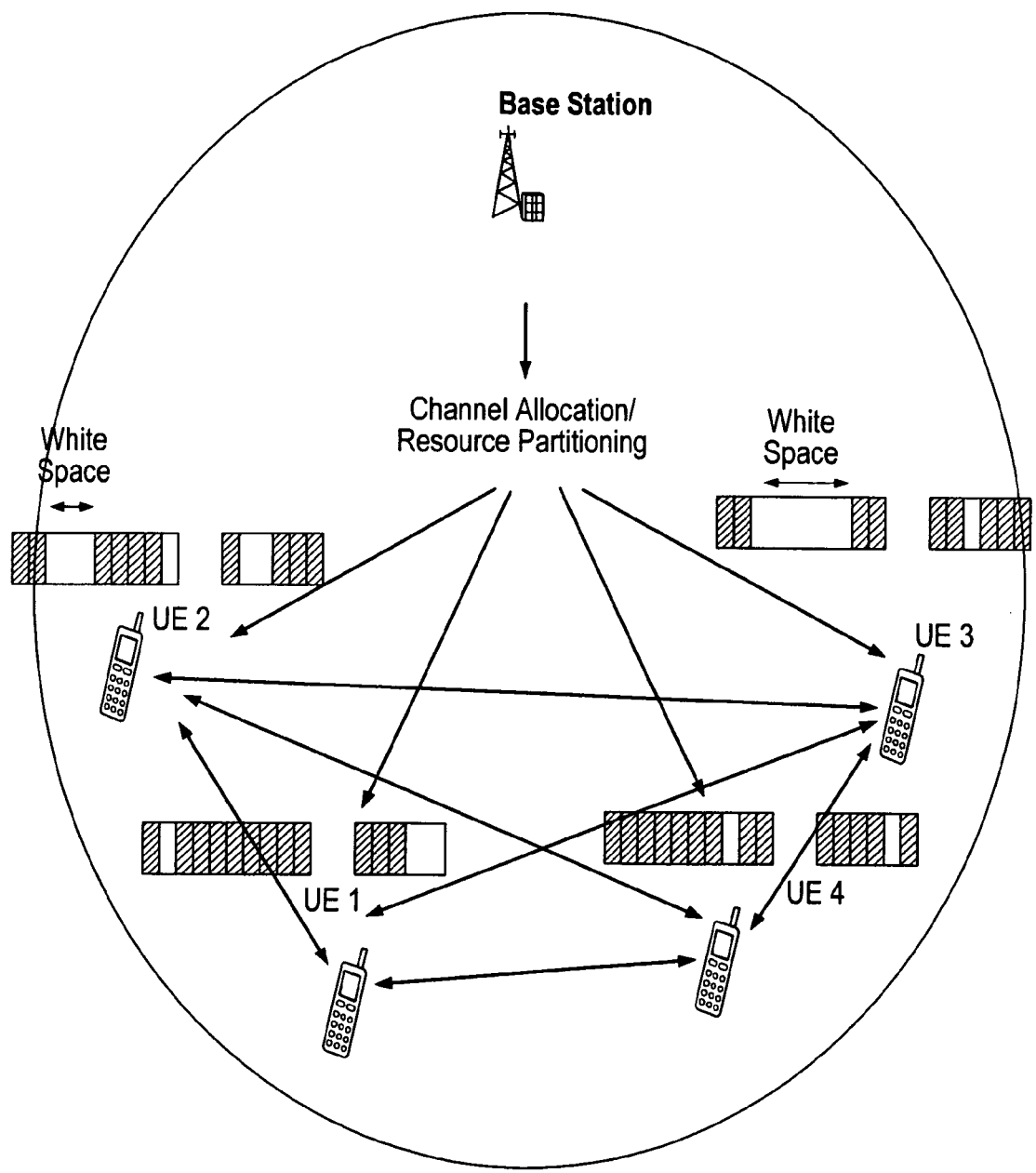
FIG. 6 shows another example of a first phase of a method embodying the present invention, involving UEs as nodes of a network.

Step 6: The transceiver asks the other transceivers in the cluster to determine the current value of interference they are experiencing in the selected specific combination of sub-channels. It then determines how much this interference is going to be for other transceivers if it attempts to transmit in this selected combination of sub-channels. The intention is to perform these communications on a fast basis (say for example within couple of ms) to take maximum advantage of fresh information and respond to fast-changing interference conditions. These may require OTA communications in the BS or UE case, a fast wired link between the two BSs, or e.g. UWB for communications between close UEs as shown in FIG. 6.

Step 7: Based on the outcome of Step 6, the currently-selected transceiver determines $\theta$ the overall interference in the same selected combination of sub-channels. It then compares $\theta$ and $\gamma_i$ to the previously recorded value of interferences for the same number of sub-channels. If this is values are less or the same, the currently-selected transceiver records the $\theta$ and $\gamma_i$ as the new recorded values and starts to transmit in this new combination of sub-channels.

Step 8: If all the number of cluster members have examined, control passes to Step 9, otherwise it is the next cluster member turn, go to step 2.

Step 9: When one channel allocation cycle for one cluster is completed, all the cluster members report their current interference level to the first node (or to a leader which may or may not be the same node), which attempts to determine the overall interference in the cluster $\theta_f$.

Step 10: To maintain fairness, it is preferable to rotate the order number so that the first transceiver is now the second transceiver. The process returns to Step 1 and starts another channel allocation process with the next cluster.

In the above algorithm, how many channels each node can listen to (the ideal case is to monitor all the possible combinations) will decide the performance of the algorithm. In addition, how much anticipation in advance is needed to perform measurements also will affect the performance and accuracy of the proposed algorithms.

One possibility to reduce the number of measurements is to rely on direct communications between UEs, as shown in FIG. 6. By exchanging the channel allocation information, the UE of interest would be aware of the potential collision of interest and already more occupied radio sub-channel in close-by UEs, and would not try to measure the combinations that have those highly occupied sub-channels included. This will save time and efforts in the UE of interest.

Figure 8:
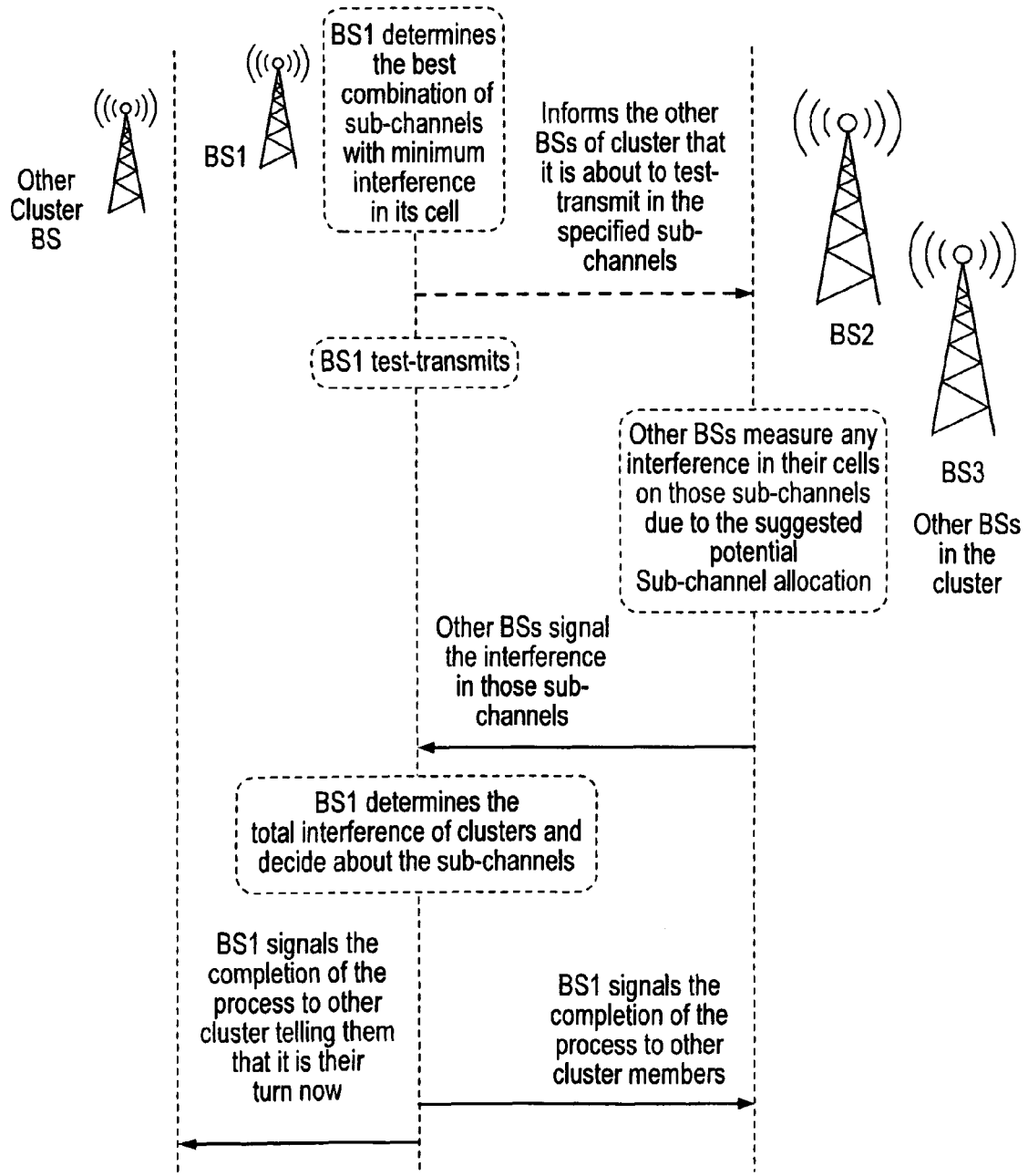
FIG. 8 is a timing diagram for steps in the first phase of the method embodying the present invention.

A suggested time diagram for interference measurement and its related signalling is presented in FIG. 8.

If in listening to interference, other surrounding clusters have impact on the interference which is usually the case, the impact of such "external" interference can be dealt as follows with by the transceiver currently selected (or the cluster leader, which may be the same thing if the leader role is rotated among the transceivers).

Figure 9:
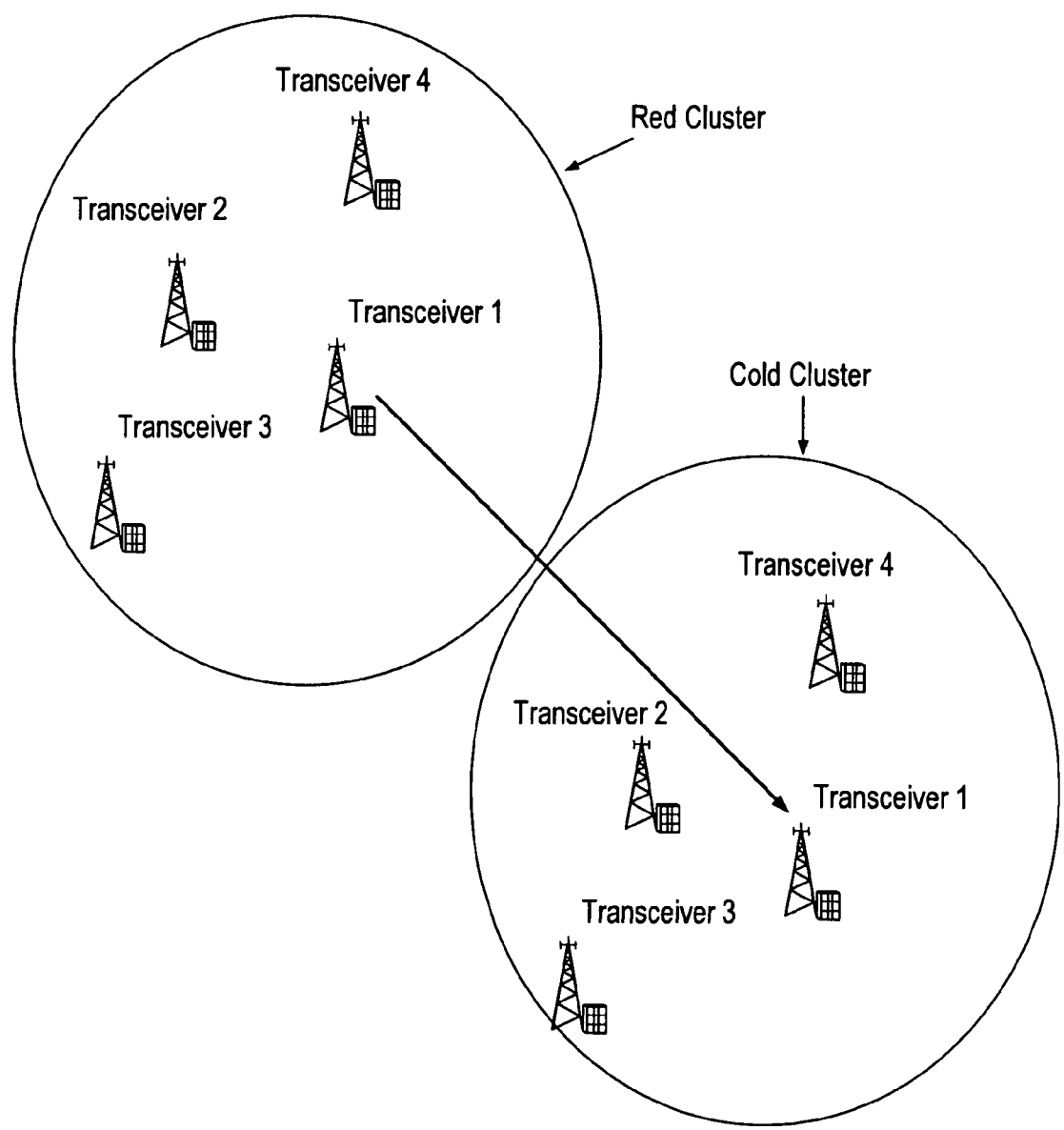
FIGS. 9 and 10 illustrate so-called hot and cold clusters in a wireless network.

When at Step 9, one cluster realises that its total final interference or $\theta_f$ is above a certain threshold then the cluster can be declared as red or interference-critical (see "Red Cluster" in FIG. 9).

Figure 10:
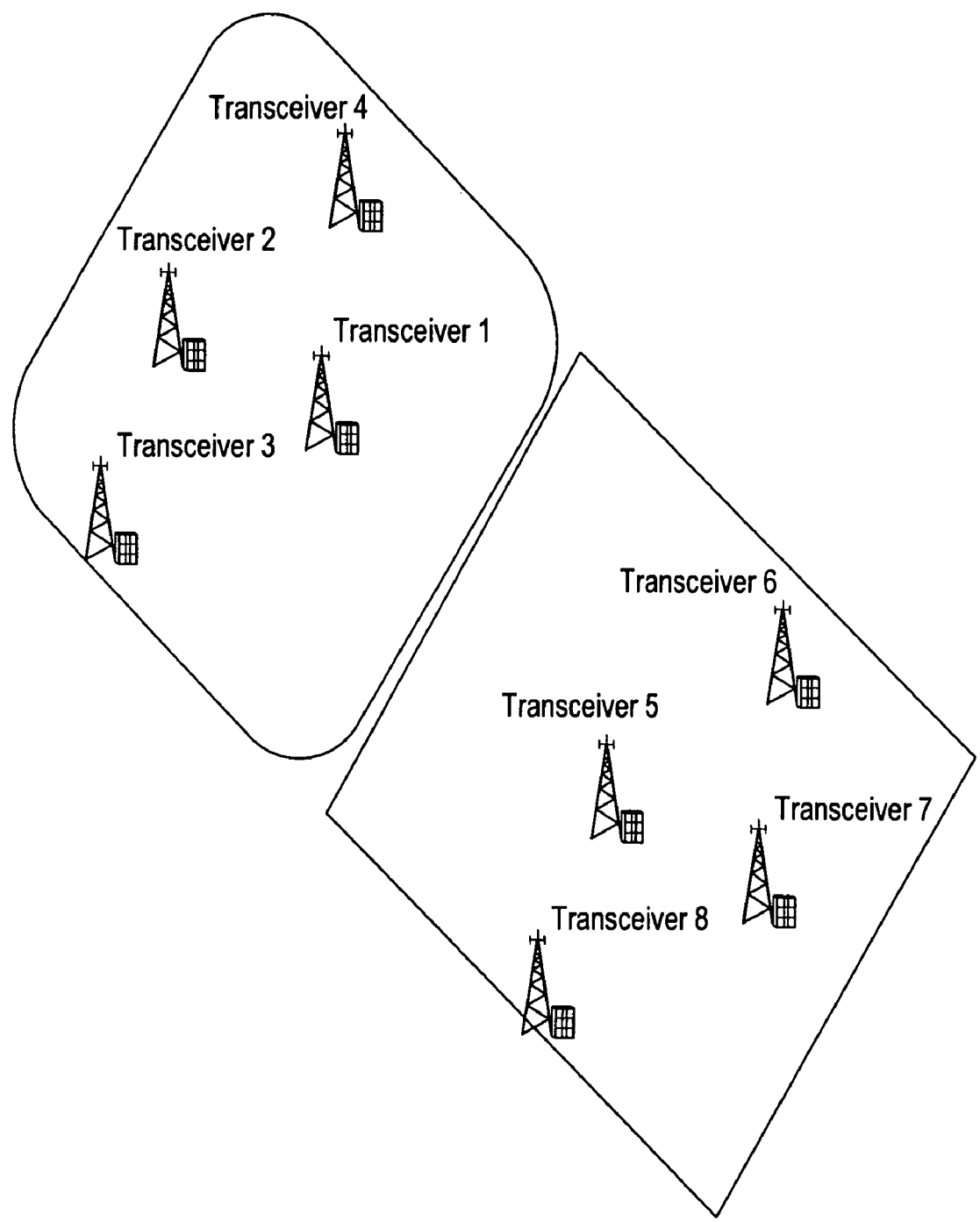

In this case, the leader of the red cluster may ask the leader of a cold cluster to merge for a joint radio sub-channel allocation process as indicated by the arrow in FIG. 9. When two clusters are about to join each other the leader of one cluster informs other members of the cluster of the upcoming change and then triggers the process of merger of the clusters. Needless to say that the leaders of cluster already know that which one of the leaders is going to be in charge of the newly formed cluster (this can be a predefined assignment). In that case a new numbering would be valid for the next dynamic channel allocation as shown in FIG. 10. Typically, the new merged cluster in FIG. 10 is partly red and partly cold.

Figure 11:
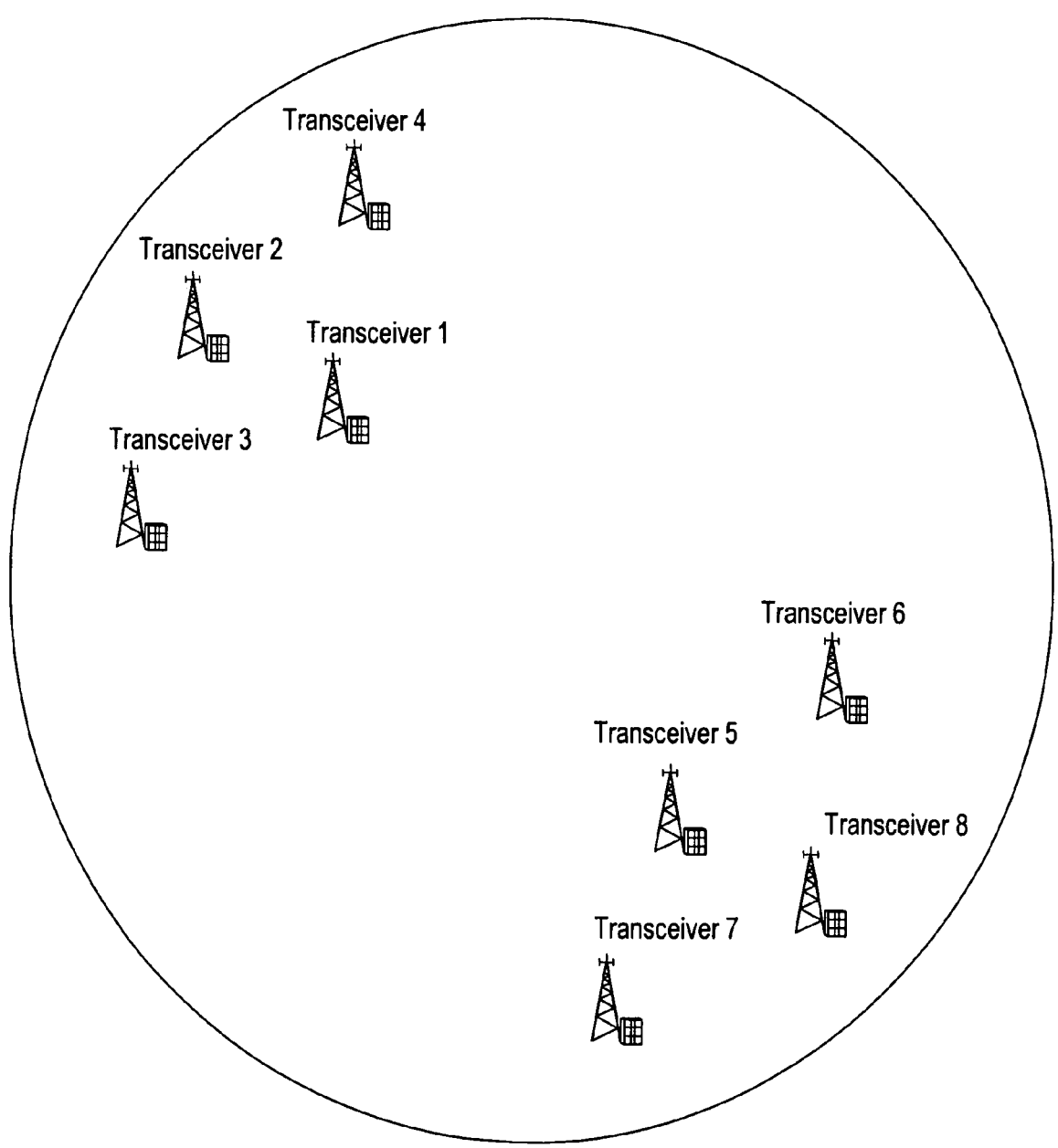
FIG. 11 illustrates a merged cluster formed by merging the two clusters shown in FIG. 10.

The aim of joint distributed sub-channel channel allocation with extended cluster numbering is to reduce the temperature of the entire cluster in terms of interference to cold (low-interference state), with the result as shown in FIG. 11.

To achieve that, after the merger the procedure would start from step one for the new extended cluster with more transceivers. When the entire cluster is cold the cluster may be split back to two original clusters. This may be determined, for example, by comparing the overall interference level with a second, lower threshold.

One feature of such a merger is to make the other clusters aware of the situation with the troubled (in red) cluster and its troubled interference management and radio channel allocation.

If after the merger the entire overall cluster interference fails to reduce and remains red then gateway assistance needs to be sought to resolve the interference problem. This is addressed in the second phase of a method embodying the present invention, described later.

To evaluate the performance of the above-outlined process, simulations have been carried out on the following basis.

A cluster of transceivers within one wireless network is considered. It is assumed that 12 sub-channels are available. To make a fair comparison it is assumed that the received useful signal power is the same for all the transceivers and SIR is determined based on the assumption that they have similar received power. Adaptive channel coding rates for a data packet and radio node have been considered to enable the radio nodes to adjust their transmission rates and consequently the target SIR values. The BER requirement selected for simulations is $10^{-3}$, and it is assumed that a Reed-Muller channel code RM(1,$m$), is used. The coding rate combinations and the corresponding SIR target requirements used for the simulations are related as shown in Table 1.

TABLE 1

Code Rates of Reed-Muller Code RM (1, m) and
Corresponding SIR Requirements for Target BER

| m | Code Rate | SIR (dB) |
| --- | --- | --- |
| 2 | 0.75 | 6 |
| 3 | 0.5 | 5.15 |
| 4 | 0.3125 | 4.6 |
| 5 | 0.1875 | 4.1 |
| 6 | 0.1094 | 3.75 |
| 7 | 0.0625 | 3.45 |
| 8 | 0.0352 | 3.2 |
| 9 | 0.0195 | 3.1 |
| 10 | 0.0107 | 2.8 |

Figure 12A:
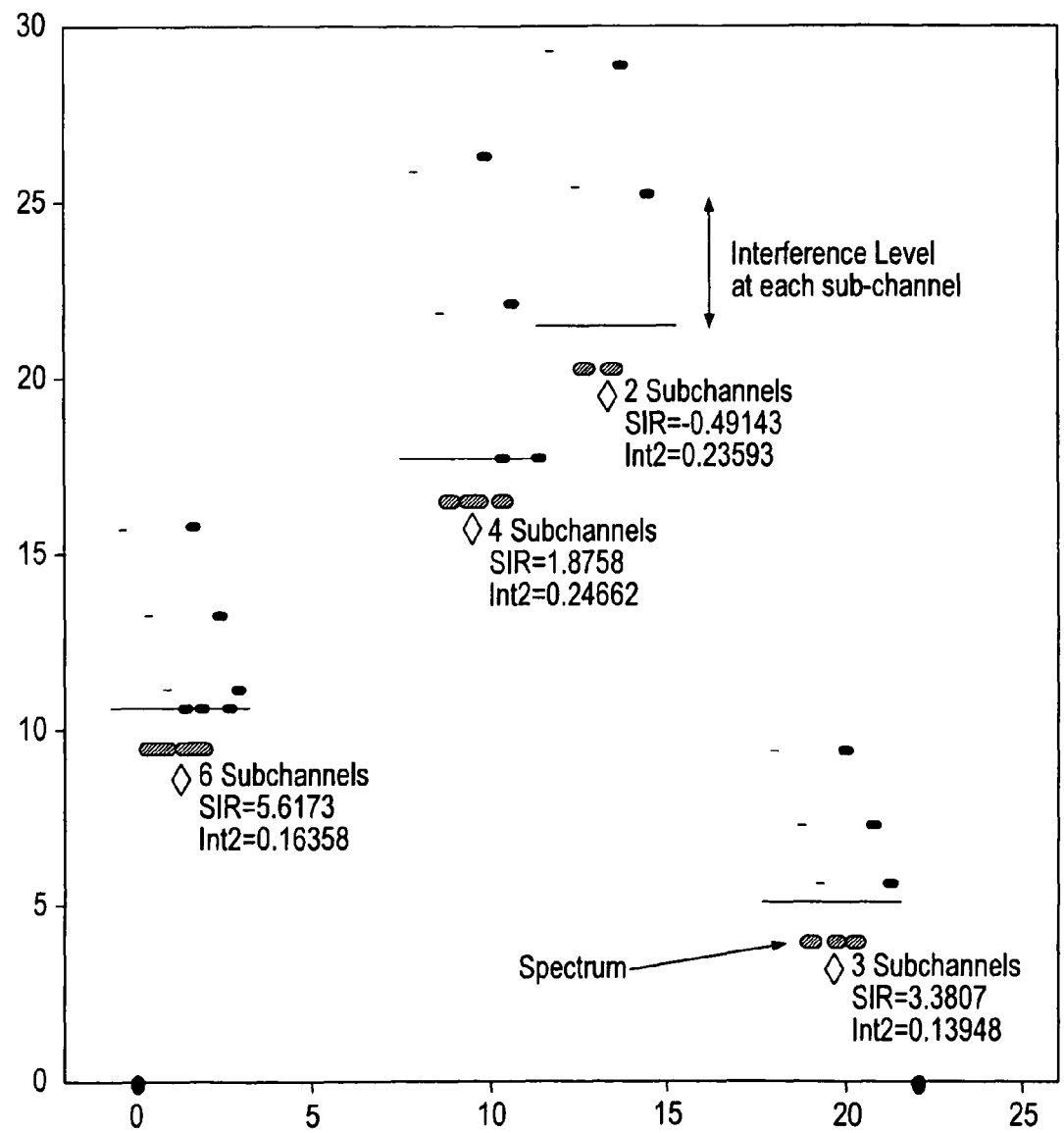
FIGS. 12A and 12B, and FIGS. 13A and 13B show results of simulations of the effect of the first phase of the method embodying the present invention, FIGS. 12A and 13A showing an interference situation before performing the first phase and FIGS. 12B and 13B showing the situation after completing the first phase.
Figure 12B:
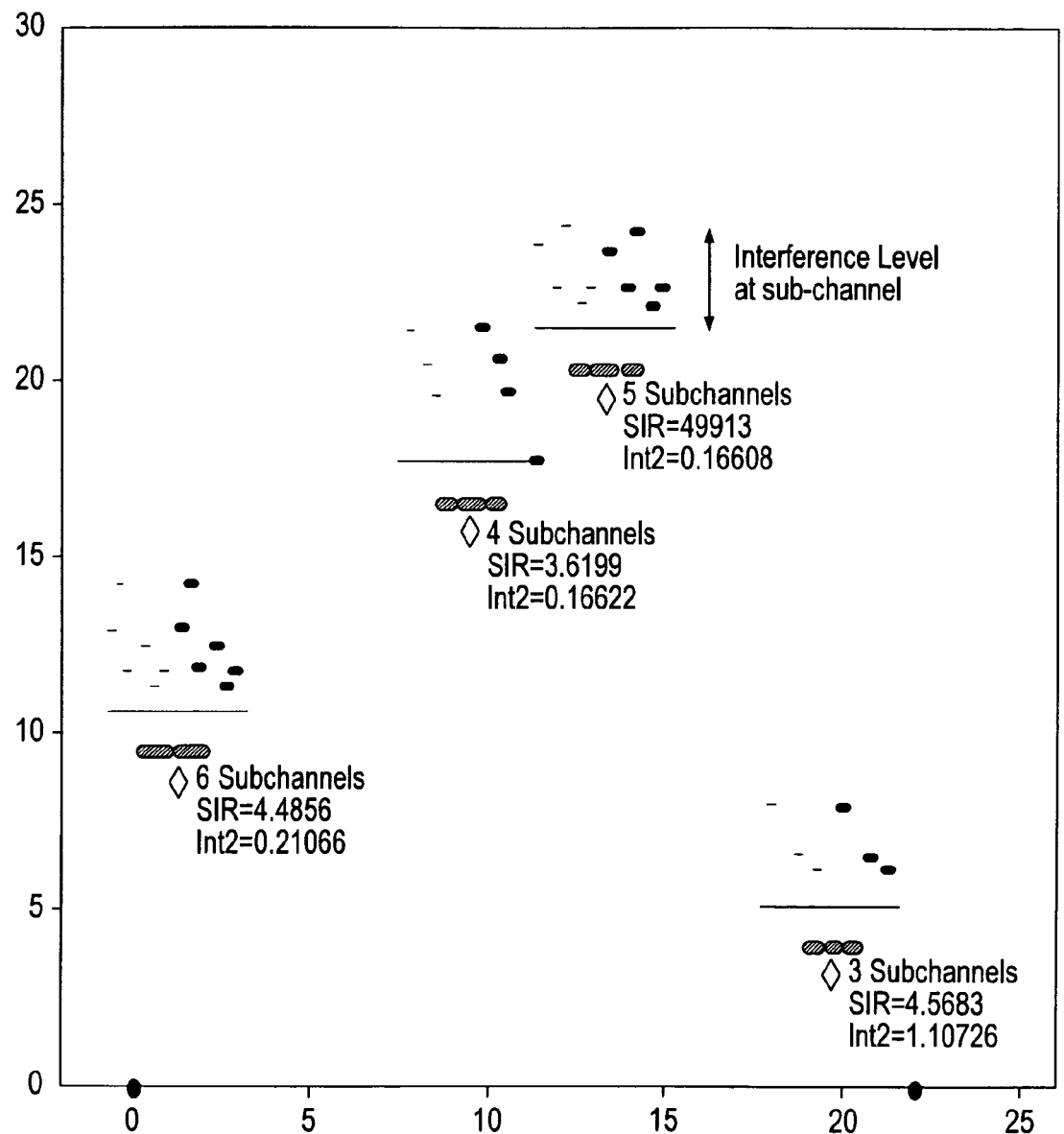

The results depicted in FIGS. 12A and 12B show how successfully the dynamic channel allocation process of the above first phase has managed to reduce the interference inflicted in each transceiver and the interference on other transceivers by each transceiver at sub-channel level while in some case the transceiver has managed to occupy more radio sub-channels.

In FIGS. 12A and 12B, the main X and Y axes represent distance (e.g. in kilometres) in a geographical region containing a number of transceivers such as base stations. Each diamond represents a transceiver located at a particular geographical position for the purposes of the simulation, above which is schematically shown an interference plot (interference level vs. sub-channel number). For each transceiver, the narrow line bar represents the interference inflicted on other transceivers on current sub-channel, and the tick line bar represents the interference inflicted from other transceivers in the current sub-channel. The lighter patches in the lower part of each interference plot represent blue sub-channels. The darker patches in the upper part of each plot represent red sub-channels. Comparing the arrowed lines marked "Interference Level" in FIGS. 12A and 12B ("before" and "after" respectively), indicates a reduction in interference obtained by applying the method of the present invention.

Thus, these Figures show snapshot results of the distributed and dynamic interference management channel allocation process performed in the above first phase of the method embodying the present invention.

Figure 13A:
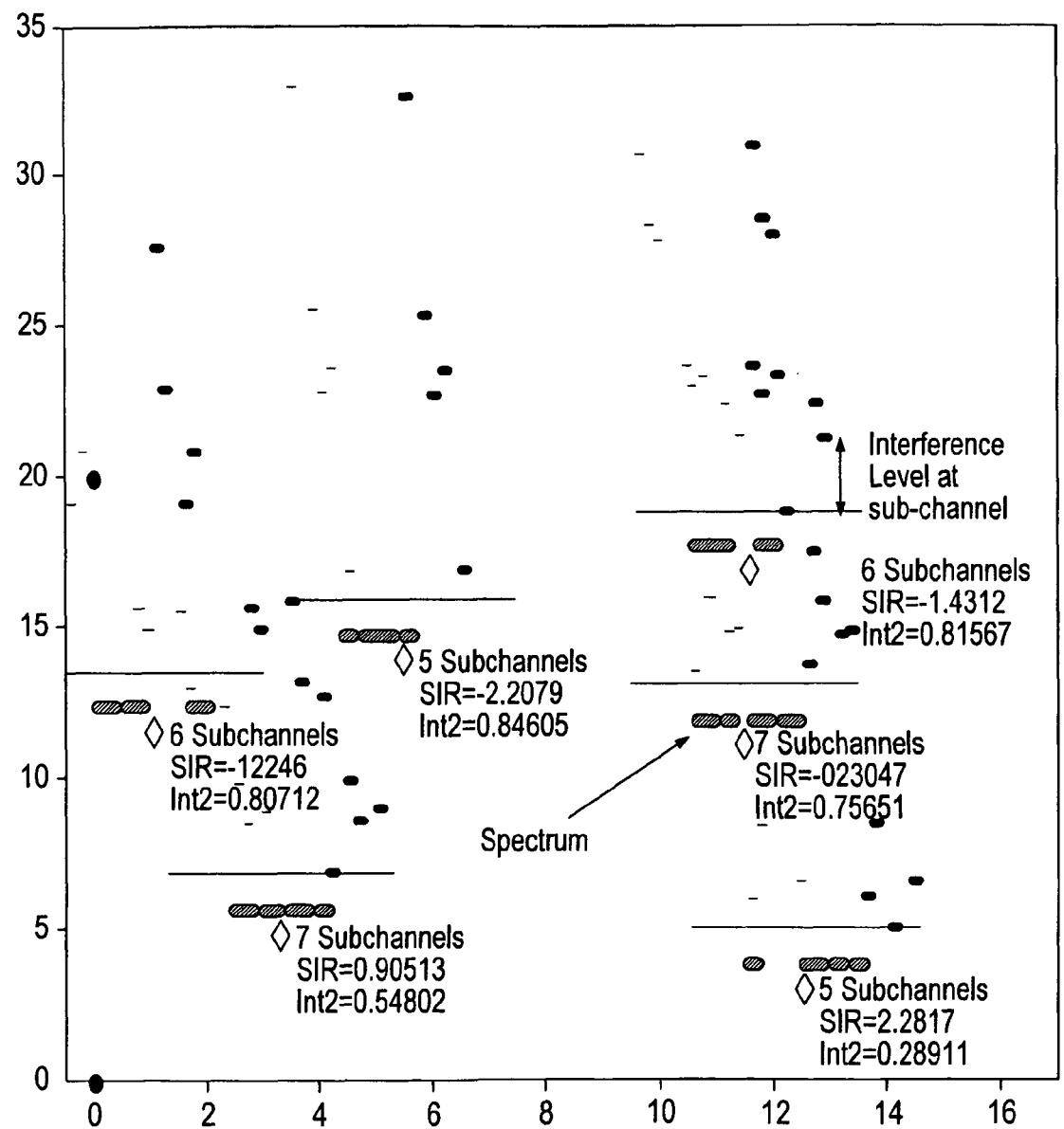
Figure 13B:
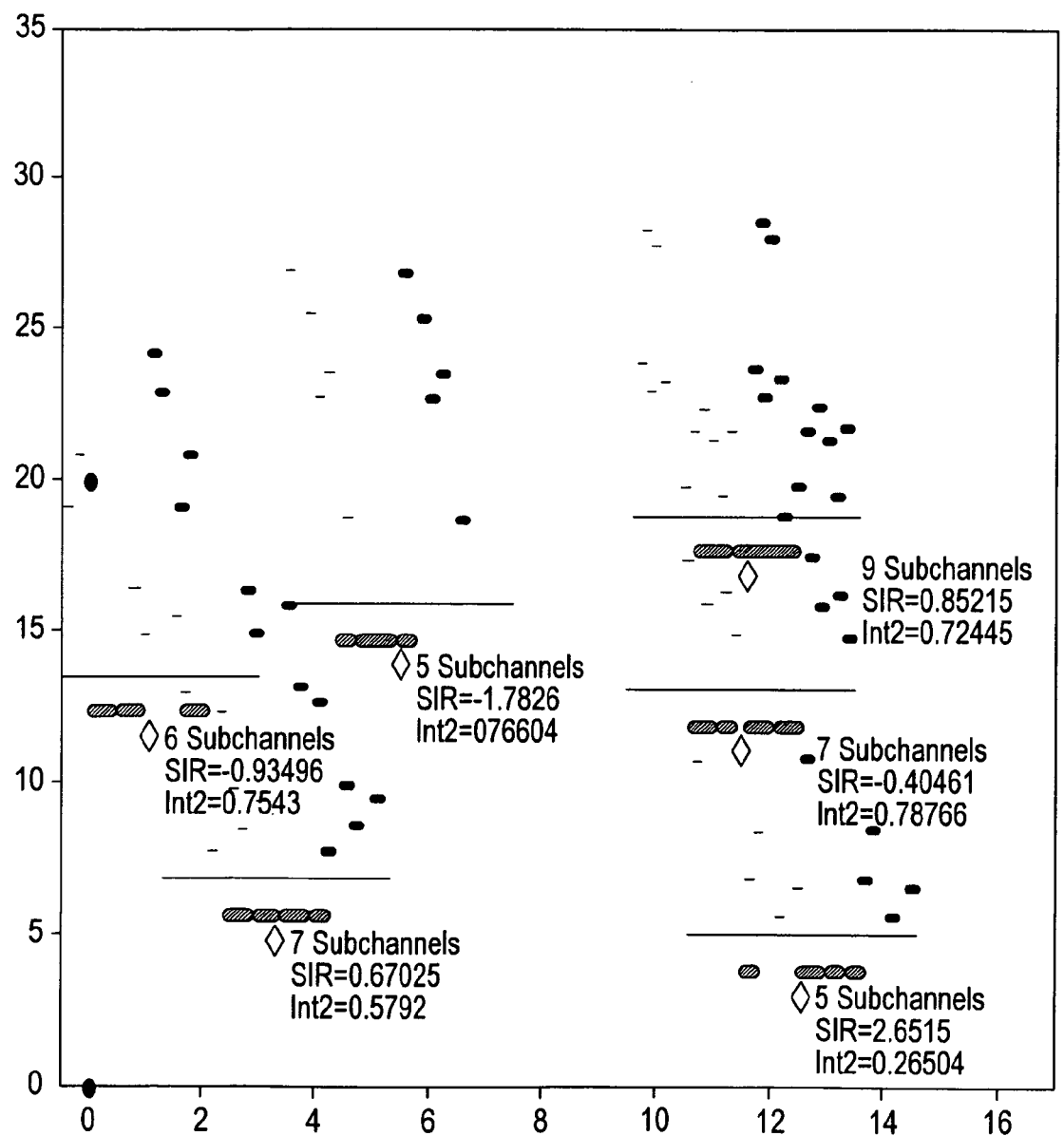

In FIGS. 13A and 13B, another potential scenario is presented. This again shows how a method embodying the present invention can succeed in reducing the interference inflicted in each transceiver, and the interference on other transceivers by each transceiver, at sub-channel level.

As will now be explained, the method described above ("first phase") may not always succeed in forming a "cold" cluster. Consequently there may on occasion be a need for a centralized gateway controlled fast and dynamic radio channel allocation and resource partitioning in wireless networks to assist the above distributed solution. The term "gateway controlled" is used as a convenient label, but the notion of a gateway is just an example, and the method to be described may be performed using a different centralized RRM entity or "network manager".

There are two main scenarios in which it will be found useful to employ a centralized allocation scheme.

Figure 14:
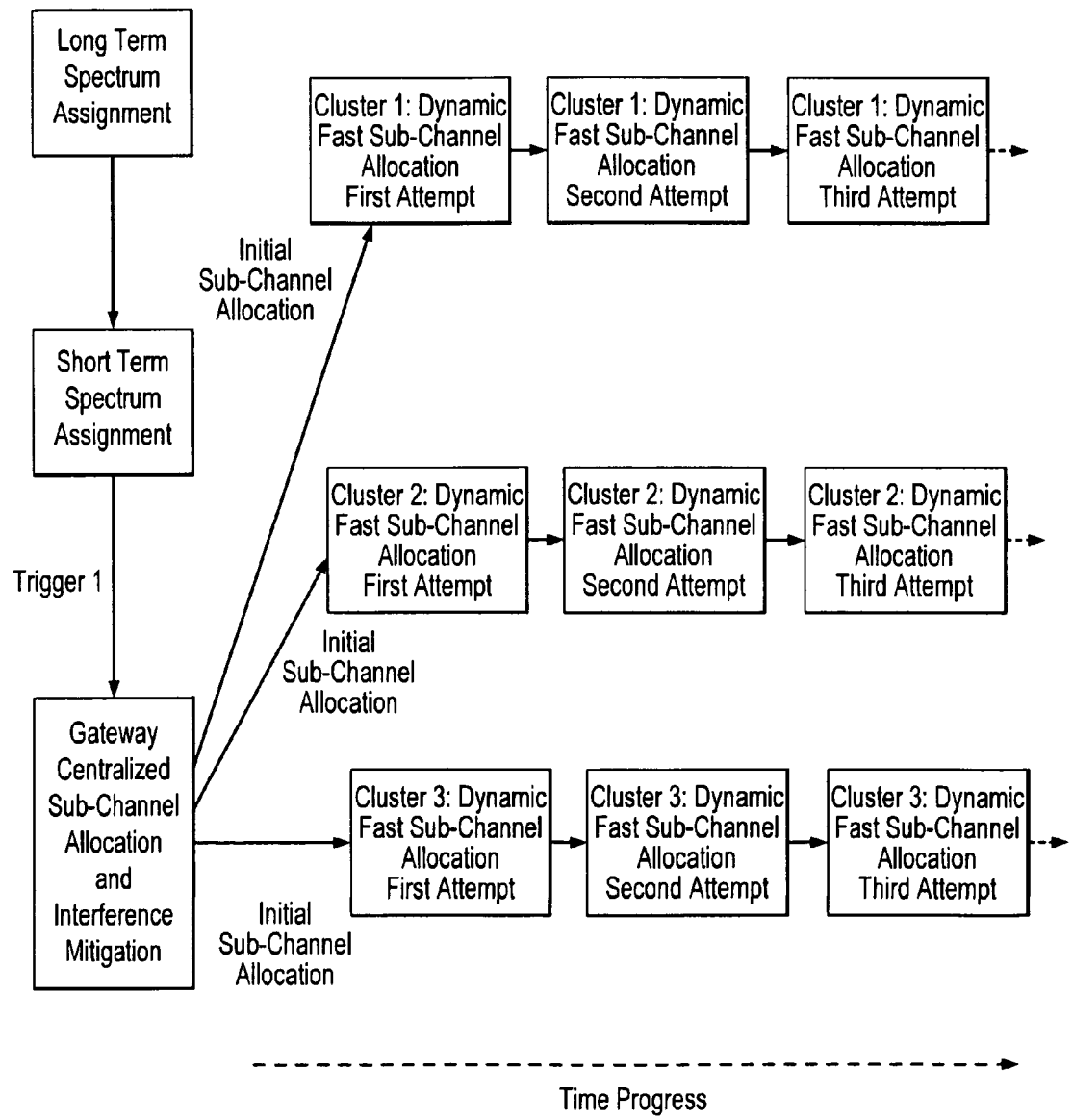
FIG. 14 shows how the first phase of the method embodying the present invention is related to a second phase involving centralized sub-channel allocation.

Scenario 1: Initialization after Short Term spectrum assignment:

Immediately after long term spectrum assignment and after a first round of short term spectrum assignment, although the overall boundaries of spectrum are known, the sub-channels are not allocated yet. The process of centralized gateway dynamic channel allocation is performed to provide an initialization for sub-channel allocation before fast distributed dynamic channel allocation for the distributed channel allocation in the above first phase. This is illustrated in FIG. 14.

Figure 15:
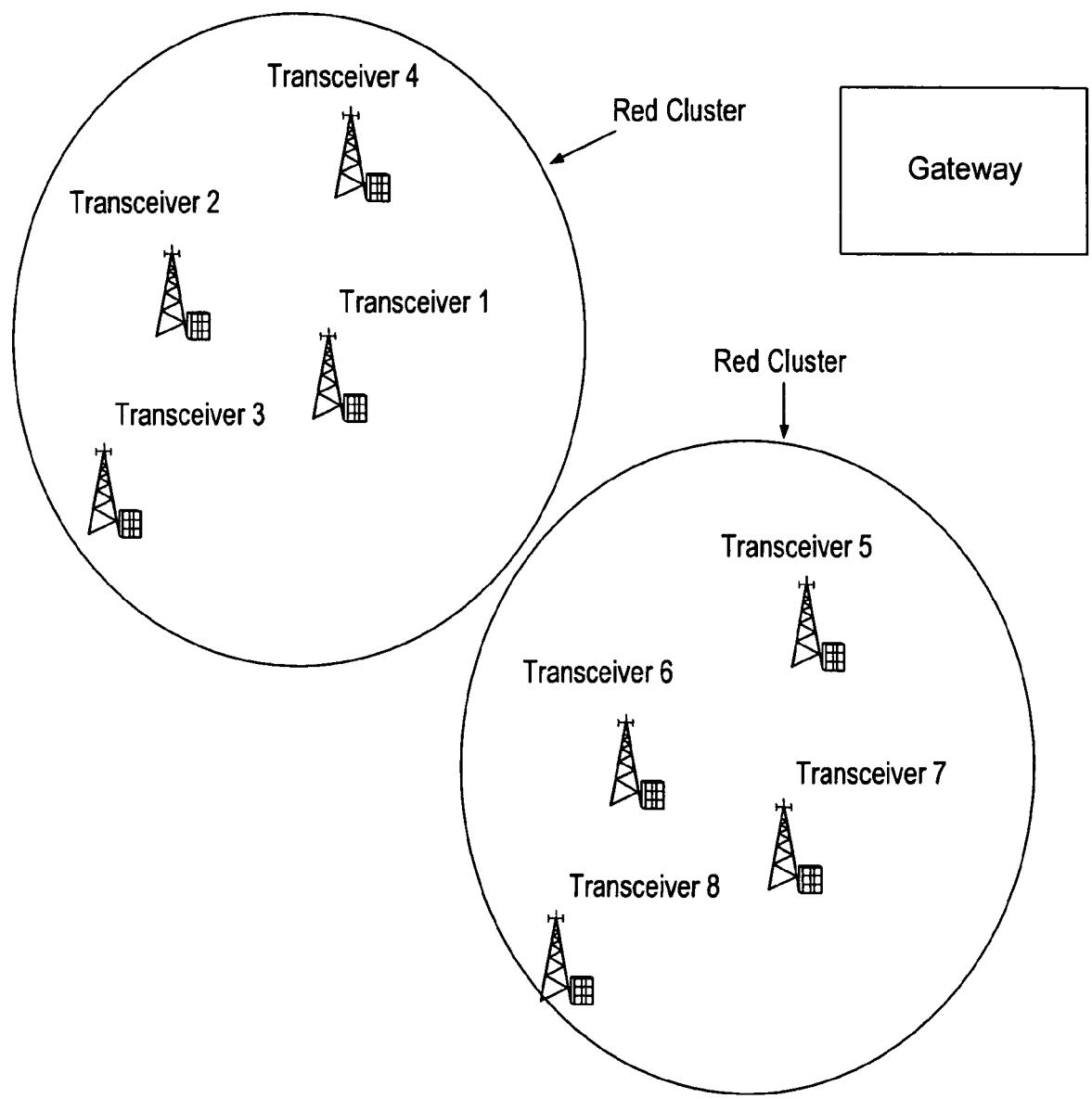
FIGS. 15 and 16 illustrate a situation in which the second phase of the method embodying the present invention is triggered.

Scenario 2: Conflict Avoidance triggers when in a dynamic fast channel allocation process no cluster is available:

In the above-described first phase, as part of a dynamic distributed channel allocation process, to deal with intra cluster interference it is possible to merge two clusters, at least one of which is troubled (i.e. red) in terms of high interference, to form a cold cluster (i.e. low interference). FIG. 15 shows two troubled clusters which may attempt to merge as shown in FIG. 16.

Figure 16:
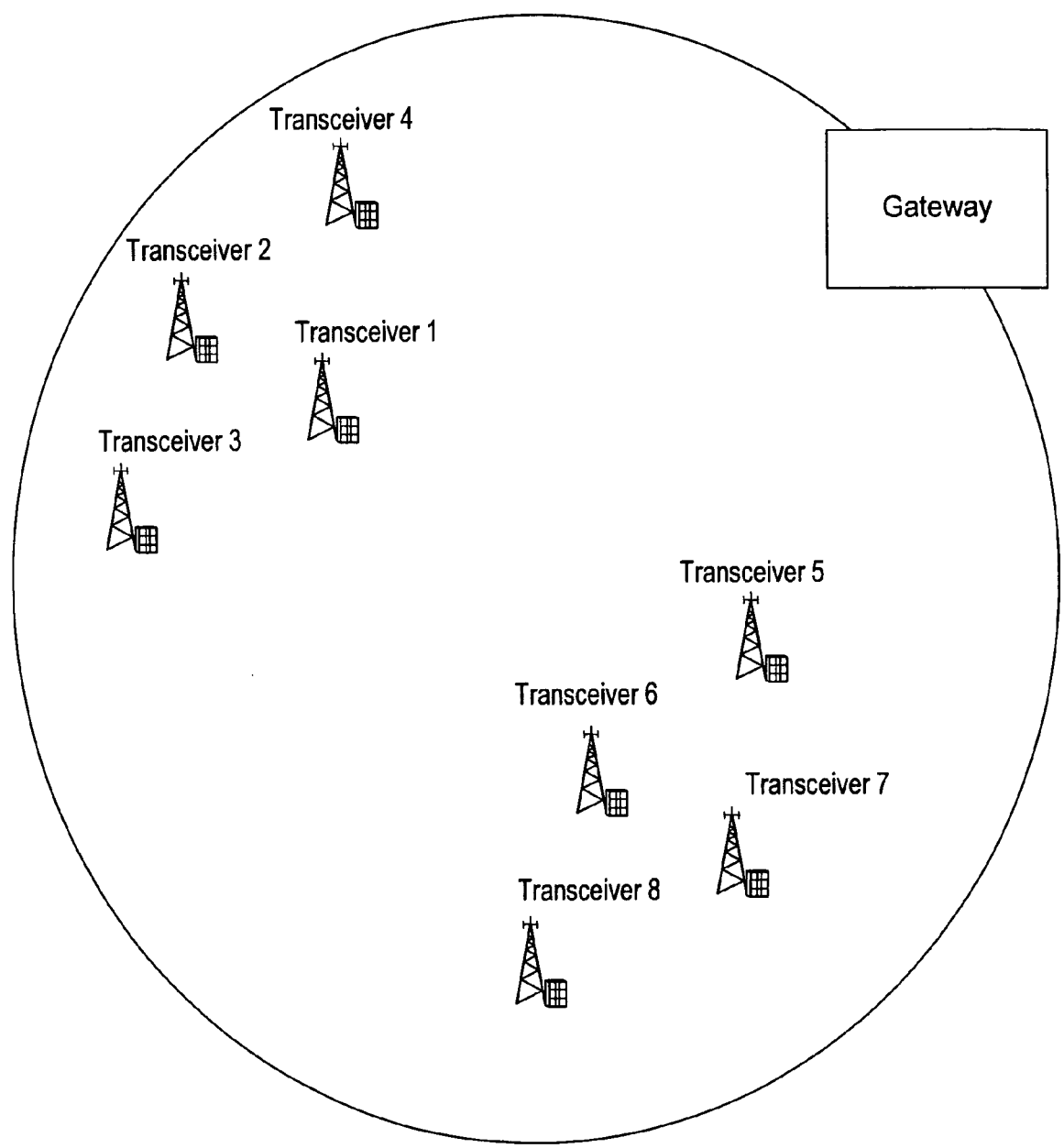
Figure 17:
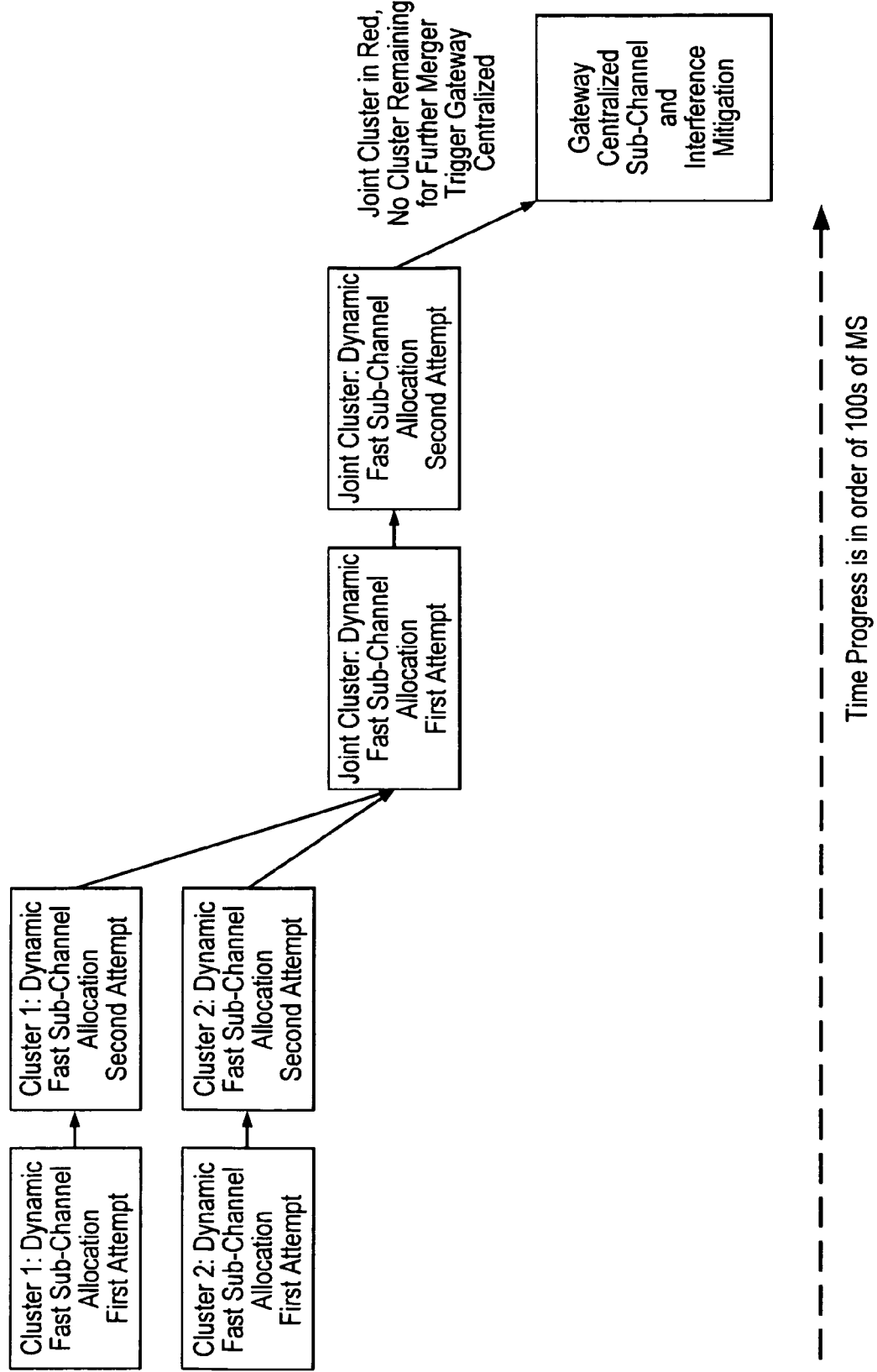
FIG. 17 shows a timing relationship between the first and second phases.

The problem is when as shown in FIG. 16, even after merging two red clusters and performing the joined dynamic channel allocation process (i.e. repeating Steps 1 to 10 on the merged cluster), the merged cluster remains in red. The merged cluster will look for further clusters to merge. If it fails to spot a further cluster it triggers a Gateway Centralized Sub-Channel Allocation and Interference Mitigation process (second phase of the method embodying the present invention) as described below. In these cases the cluster "primary BS" or leader node (also sometimes called a cluster "captain") sends such a request to the gateway or other centralized entity, as shown in FIG. 7.

The second phase will now be described by referring to FIGS. 18 to 23.

We assume as before for the first phase, that a network consisting of radio transceivers are available. It is assumed that these radio transceivers (i.e. BSs or UEs) are capable of direct communications to each other. Their communication happen either Over the Air (OTA) or over an IP link connecting them to each other as shown in FIG. 5 referred to previously. The communications can be realised through other means such as Ultra Wide Band (UWB); this could also apply where the transceivers are UEs as in FIG. 6 referred to previously. The same equations (1) to (7) may be assumed or derived as explained above with respect to the first phase of the method.

The second phase may involve the following series of steps.

Figure 18:
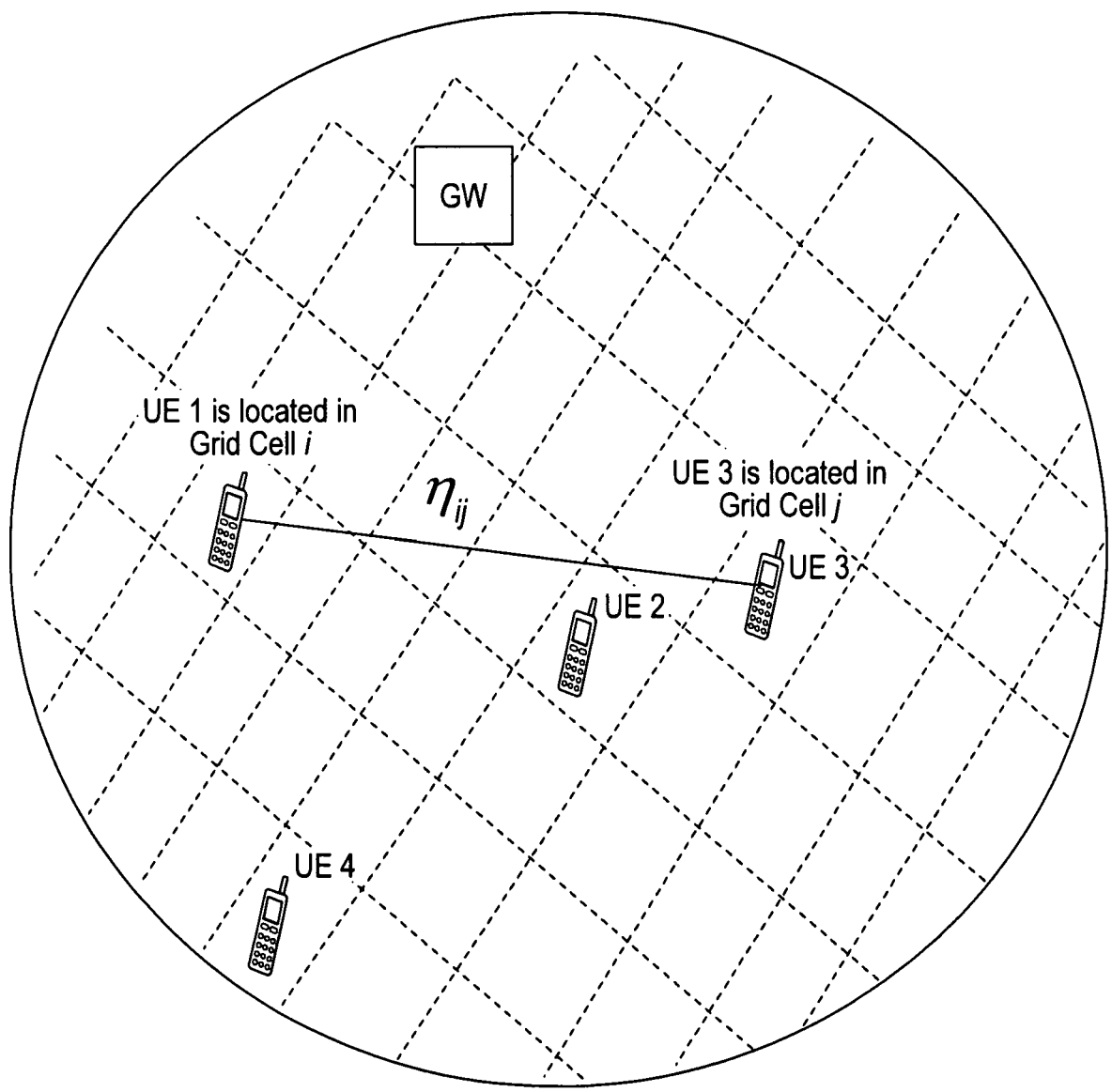
FIG. 18 illustrates UEs in a cluster to show how a gateway may estimate a path loss from one UE to another.

Step 1: Gateway seeks the information it will need to guide the allocation of subchannels. One item of information is the path loss between the nodes. FIG. 18 depicts a grid based method for estimation of path-loss parameter for UEs in the GW. GW for example has already the attenuation from grid cell i is to the grid cell j measured and stored in the memory.

Figure 19:
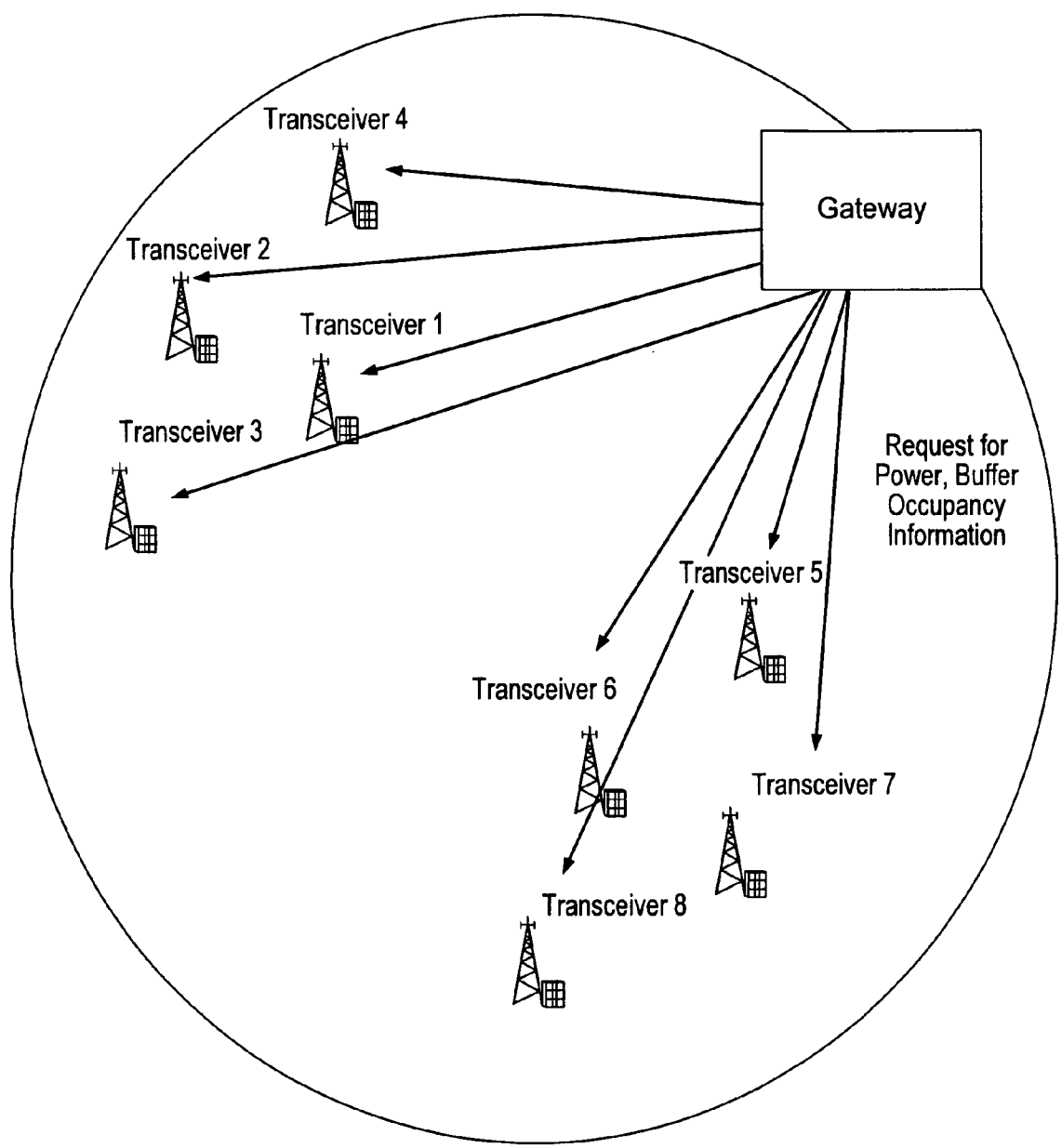
FIG. 19 shows a first step in the second phase of the method embodying the present invention.

Other information will need to be sought from the transceivers themselves. As shown in FIG. 19, the gateway may send requests for current transmission power, current buffer occupancy and current $\eta_{ij}$, namely the overall transmission gain associated with the link from the transceiver i and transceiver j. The latter quantity might be already available in the gateway.

Figure 20:
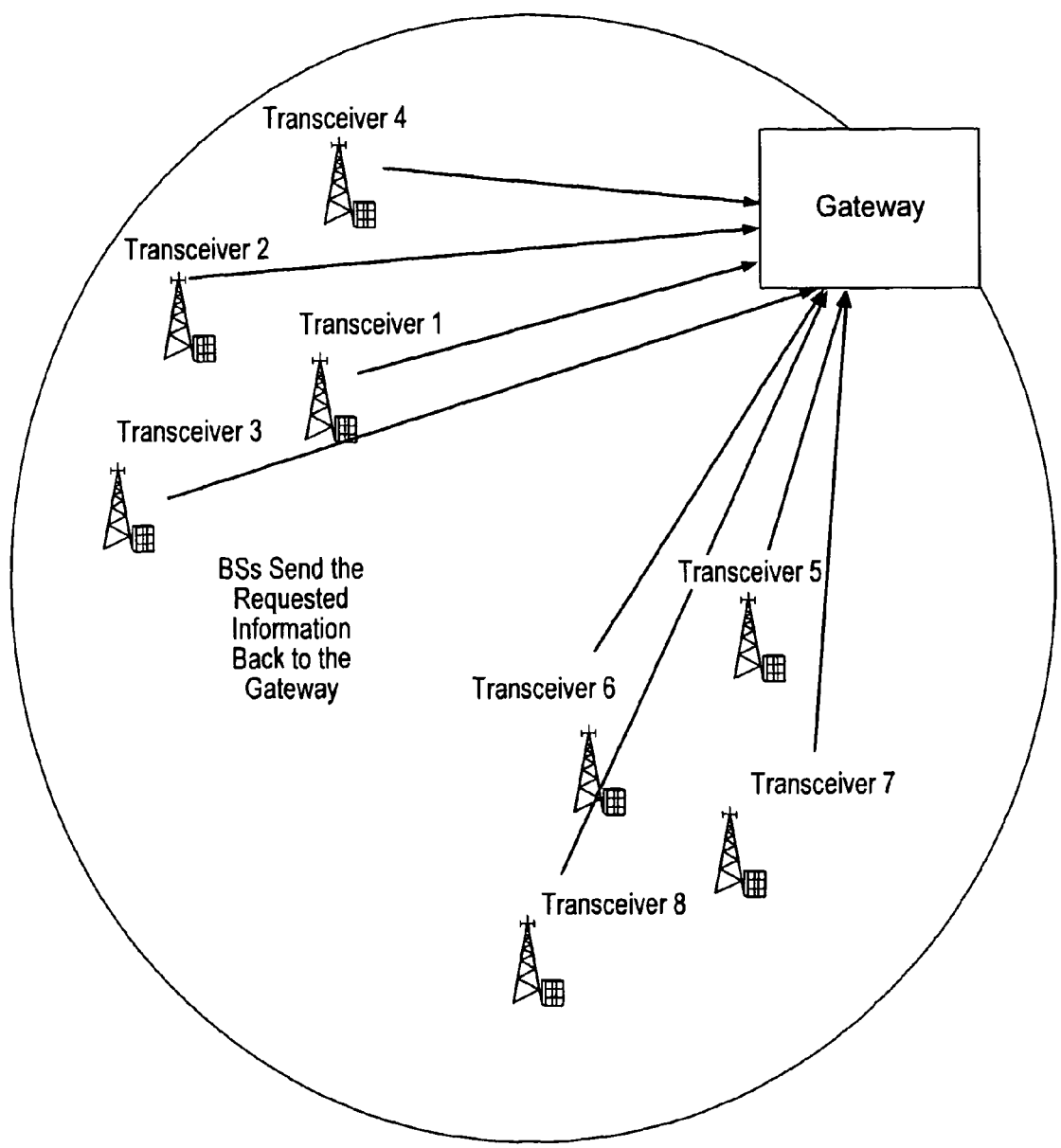
FIG. 20 shows a second step in the second phase.

Step 2: The transceivers (BSs or possibly UEs) provide the requested information to the gateway as shown in FIG. 20.

Step 3: For each BS, gateway maps the traffic load to be transmitted $\alpha_i$ to a minimum number of required sub-channels M.

Step 4: For the number of sub-channels considered for each BSs, the gateway considers the potential channel allocation for each BS. For example for each BS the combination of all the sub-channels is as depicted in FIG. 7 referred to in the description of the first phase.

Figure 21:
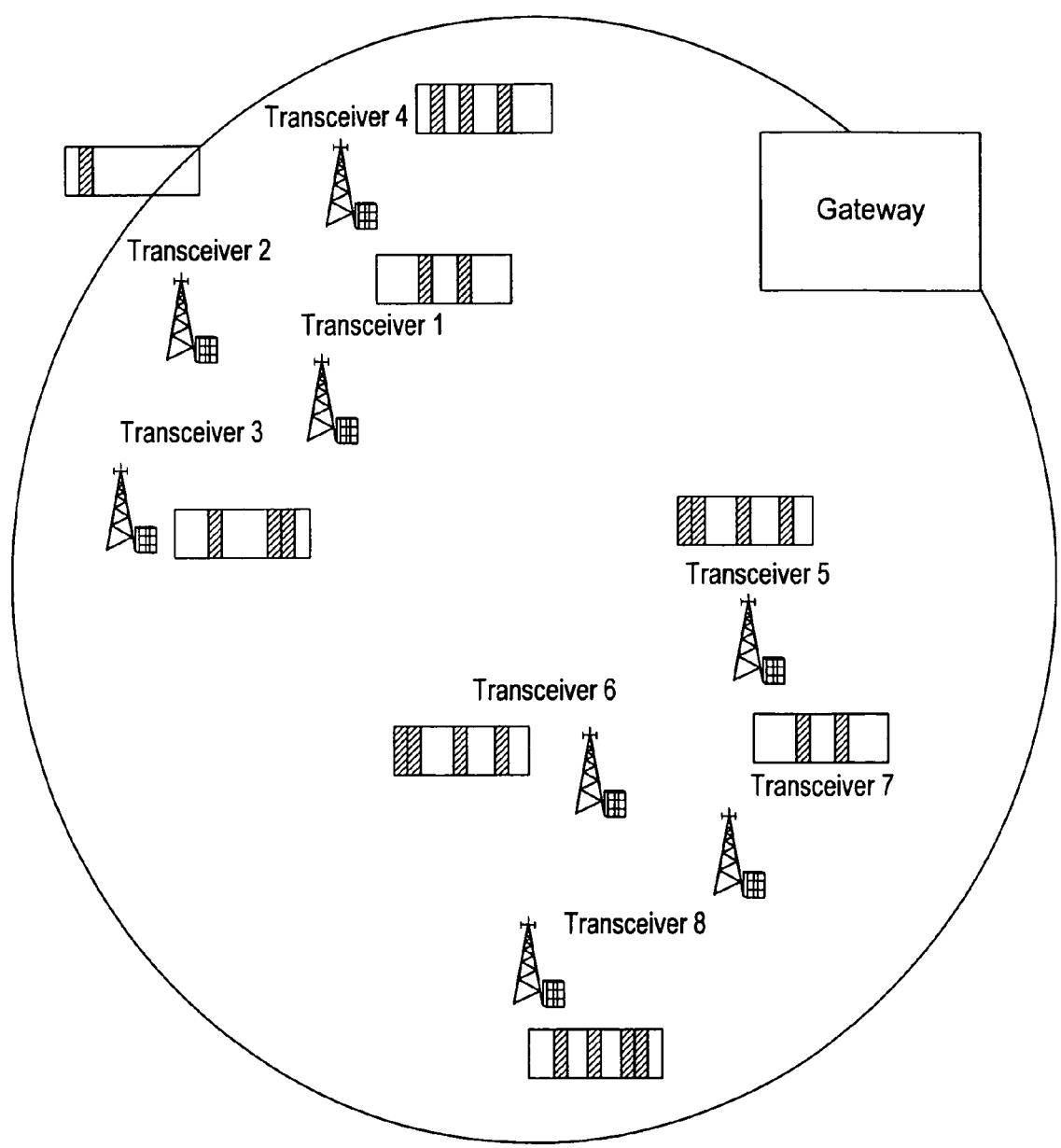
FIG. 21 shows a possible sub-channel allocation considered in another step of the second phase.

Step 5: Then the Gateway considers all or some of the possible combination sub-channel allocations to BSs (e.g. on a random basis). FIG. 21 illustrates one possible sub-channel allocation; but the gateway will also consider alternative combinations in which the same set of sub-channels may be used overall but different sets of sub-channels are allocated to the individual transceivers.

Step 6: Then Gateway considers the total interference inflicted on all the BSs and selects the combination that minimises O.

Figure 22:
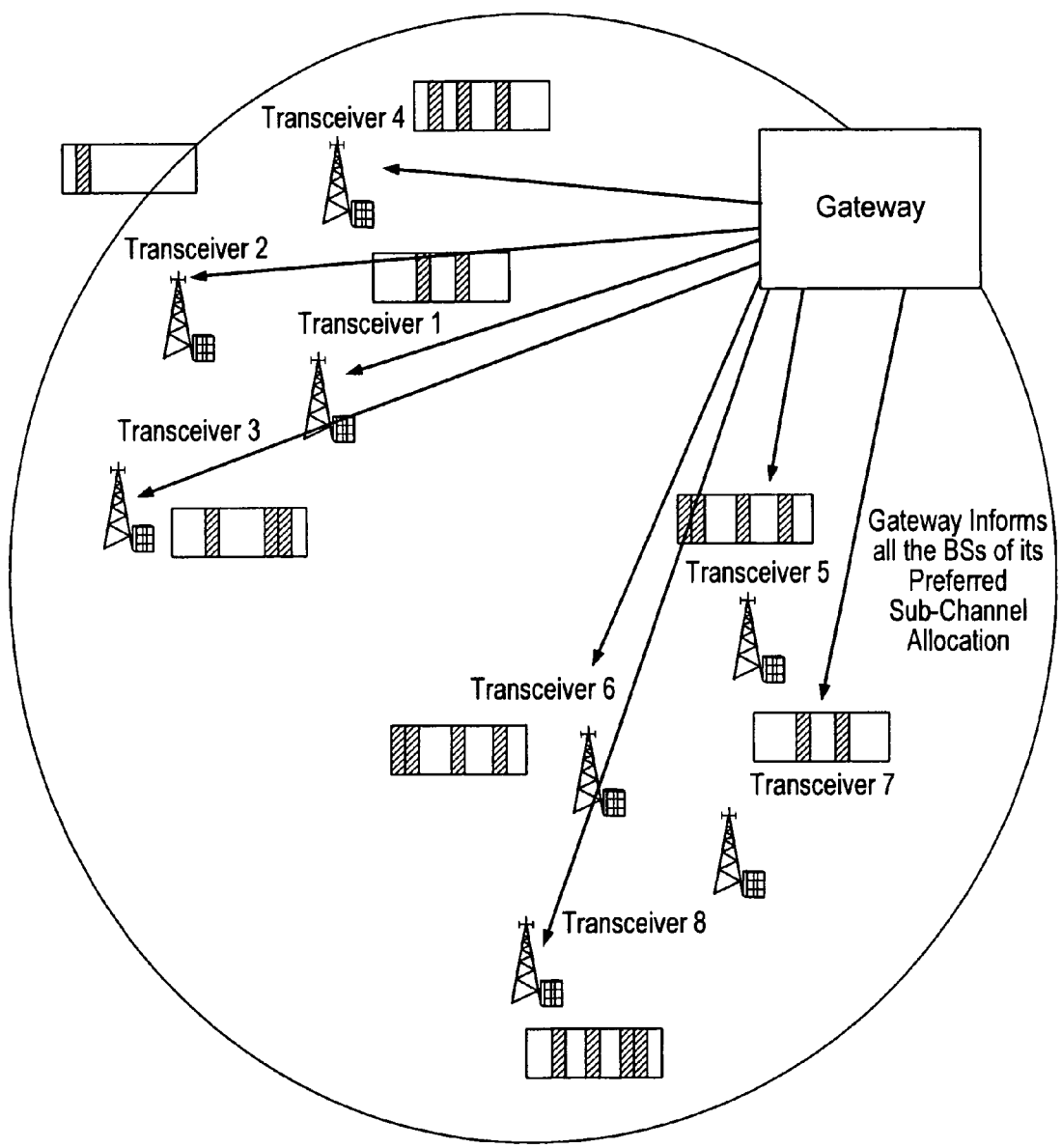
FIG. 22 illustrates a further step performed in the second phase of the method embodying the present invention.

Step 7: The Gateway lets the BSs know about this initial sub-channel allocation as shown in FIG. 22.

The above second-phase sub-channel allocation by the gateway can be considered as an initial point of start for distributed upcoming dynamic channel allocations, which may proceed in accordance with the first phase of the method as already described.

It is assumed that the transmissions will be carried out employing the old channel allocation, until Gateway issues the new channel allocation. The transmissions then will resume the transmissions based on the newly issued channel allocation.

The delay between the time of detection of the problem (no more clusters are available to merge) and the time at which the new allocation instruction reaches the BSs, is decided by four main factors:

1. Time required to communication between the BSs.
2. Time required to configure the BS.
3. The time to determine the best channel allocation in the GW.
4. The time allocated to communicated between the GW and BSs to inform them of the new channel allocation arrangement.

In order to take advantage of the fresh information, the sum of these four delay elements is preferred to be rather short and no more than couple of radio frames (say no more than 10 mS in an ideal case).

The total inflicted interference is determined based on equation (6) as described above. Looking at (6), it can be seen that to calculate the interference, the GW needs to be aware of the current transmission power level and the path-loss from each BS to another. The path-loss metrics for BSs are assumed to be already measured and stored in the GW memory as a matrix on an approximate basis. The only parameter to be updated therefore in GW is the current transmission power level in the BS.

Things are more complicated when UEs form the cluster. In this case, the power still is the only necessary parameter but the problem is that due to the mobility of UEs the path loss parameter might change radically. In this case a grid based mechanism is suggested. As shown in FIG. 18, the grid is assigned to each UE and GW is aware of the path loss from the centre of each grid cell to another one. So all GW needs is that a UE is currently located in which grid to come up with the relevant path-loss parameter. The gateway may keep track of the locations of the UEs in various ways, including using tim-difference-of-arival of signals from each UEs, or by each UE being equipped for use with positioning systems like GPS, GLONASS or GALILEO.

Figure 23:
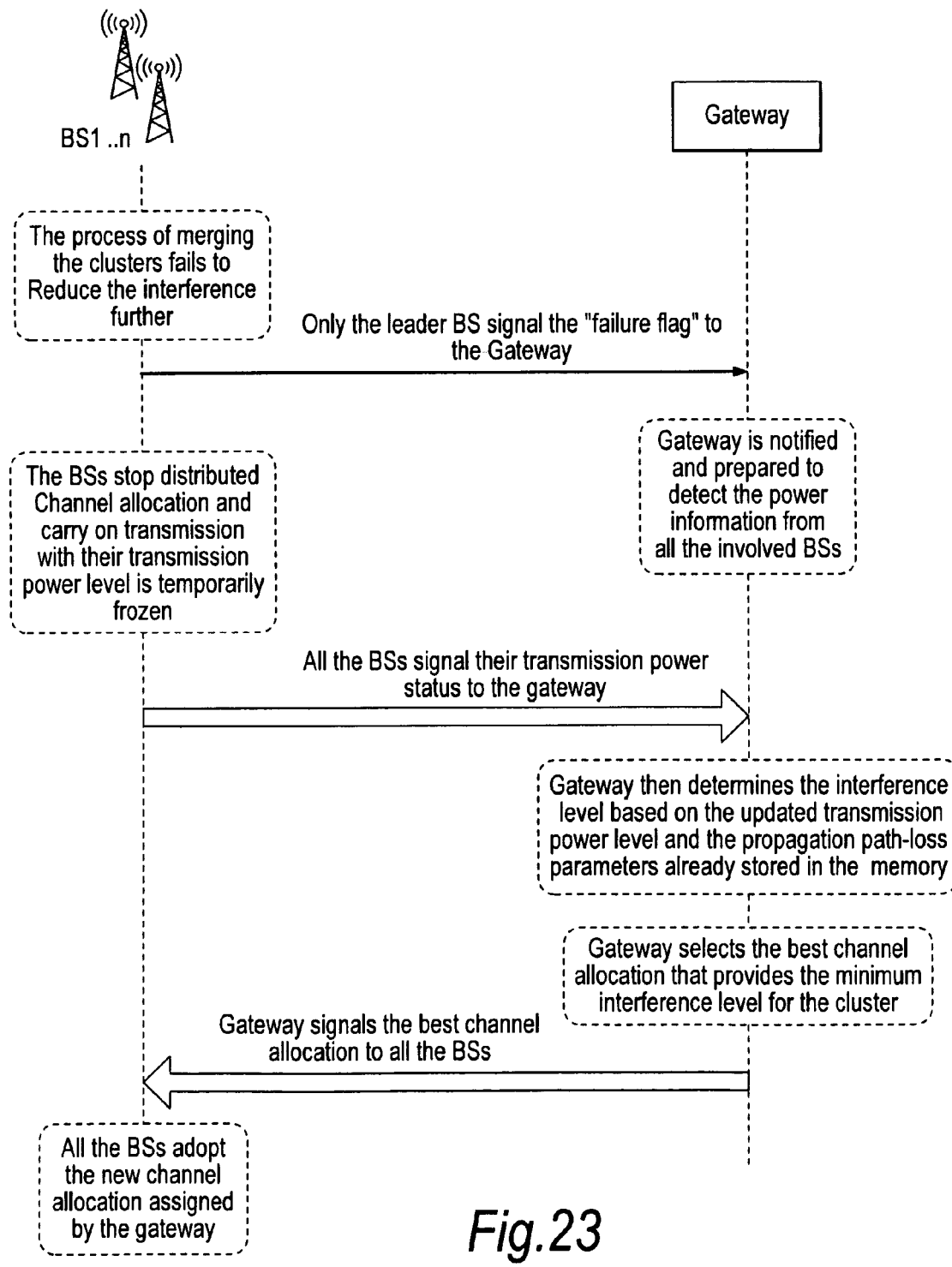
FIG. 23 is a timing diagram of steps in the second phase.

FIG. 23 is a time diagram showing the trigger for the second phase, the sequence of the main events in the second phase, and the required signalling.

As for the first phase, simulations have been carried out to show the effect of performing this phase of the method. The basis of the simulations and the assumptions made are the same as before (please refer to the description relating to FIGS. 12 and 13).

Figure 24A:
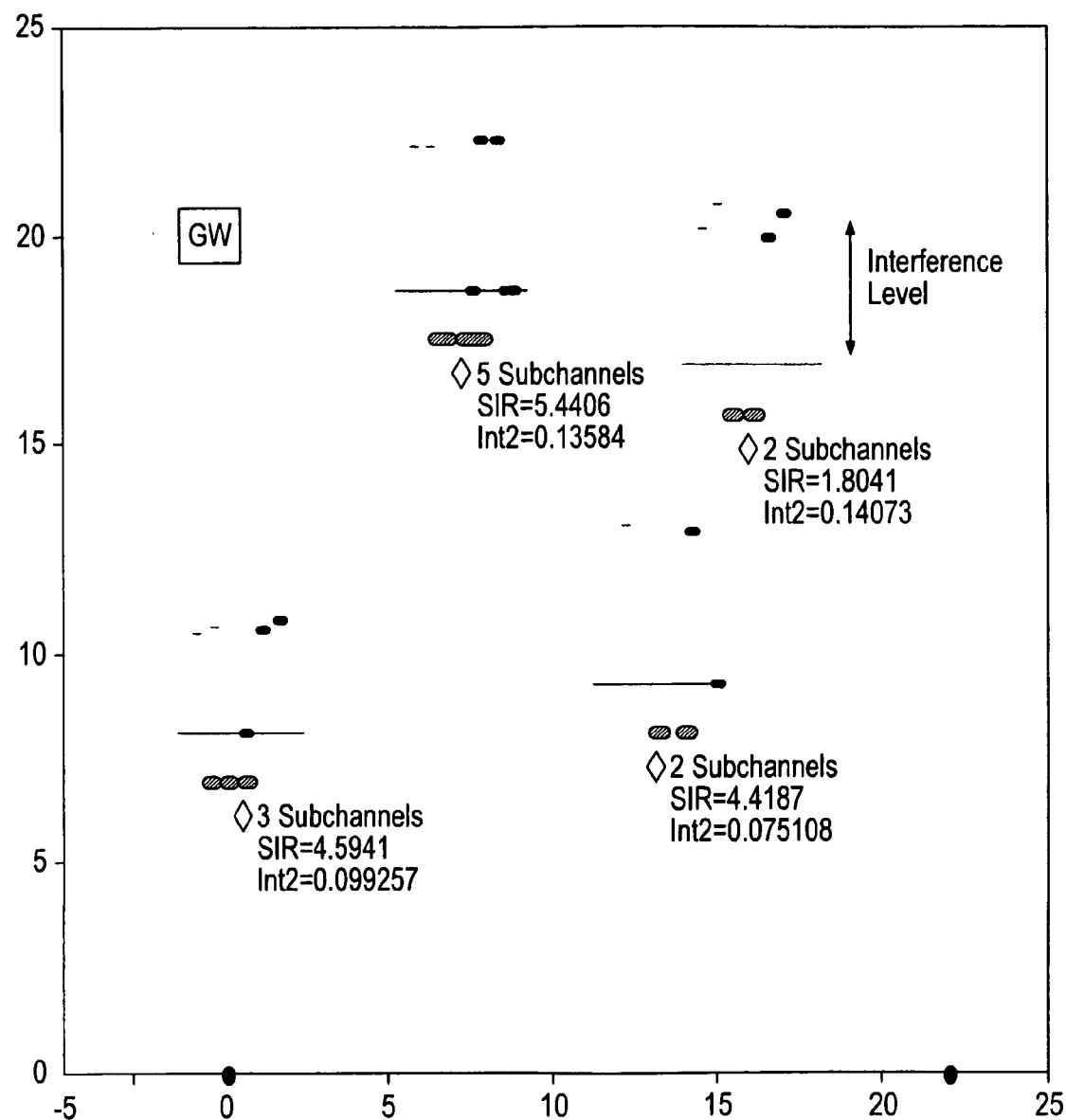
FIGS. 24A and 24B illustrate results of simulations to evaluate the performance of the second phase of the method embodying the present invention.
Figure 24B:
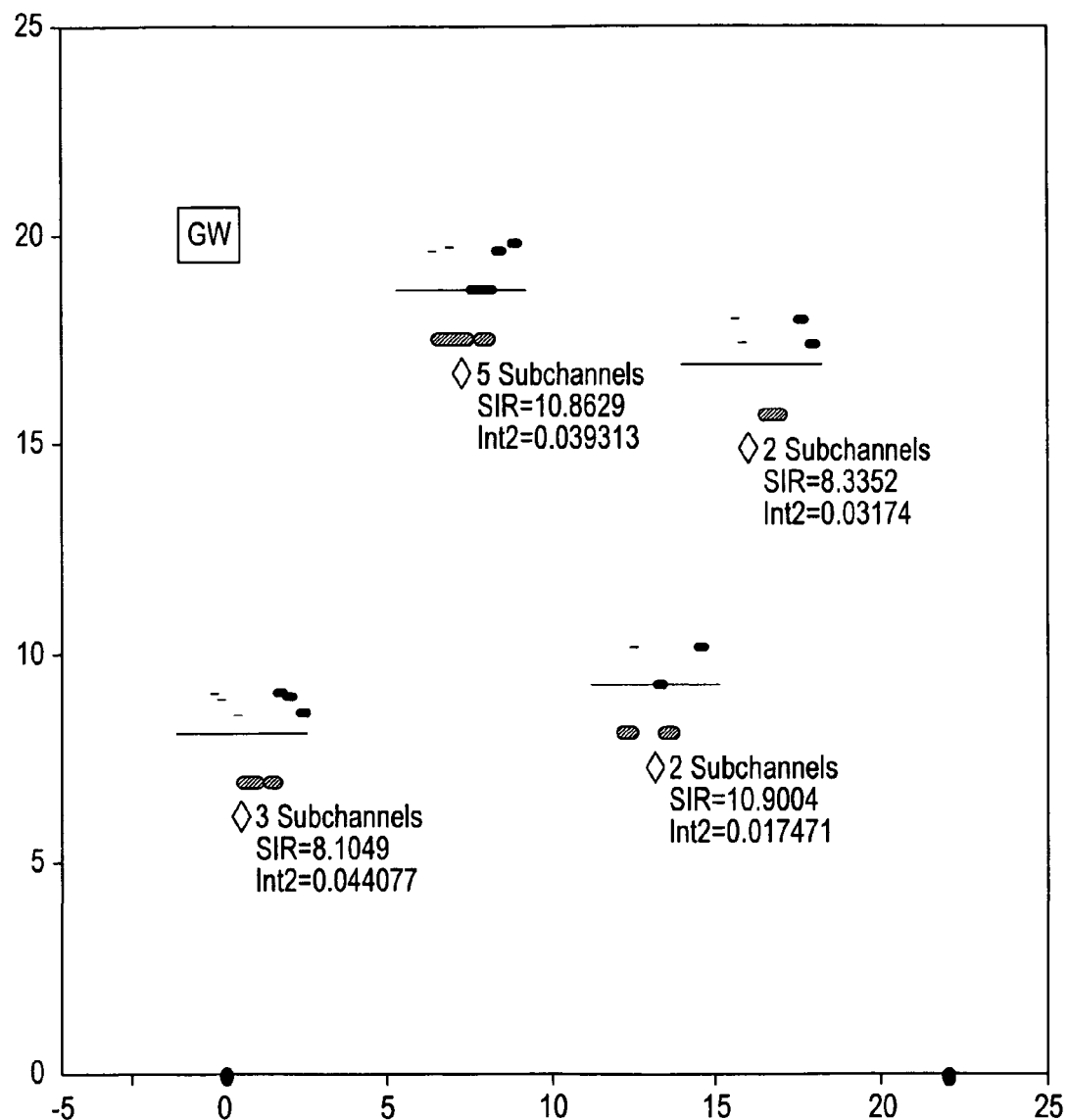

FIGS. 24A and 24B are interference plots corresponding to FIGS. 12A and 12B. That is, they show snapshot results of the centralized interference mitigation process. For each transceiver, the narrow line bar represents the interference inflicted on other transceivers on current sub-channel, and the tick line bar represents the interference inflicted from other transceivers in current sub-channel The results depicted here (FIG. 24A="before", 24B "after" the centralized allocation is performed), show how successfully the proposed gateway centered dynamic channel allocation process has managed to reduce the interference inflicted in each BS and the interference on other transceivers by each transceiver at sub-channel level.

Figure 25:
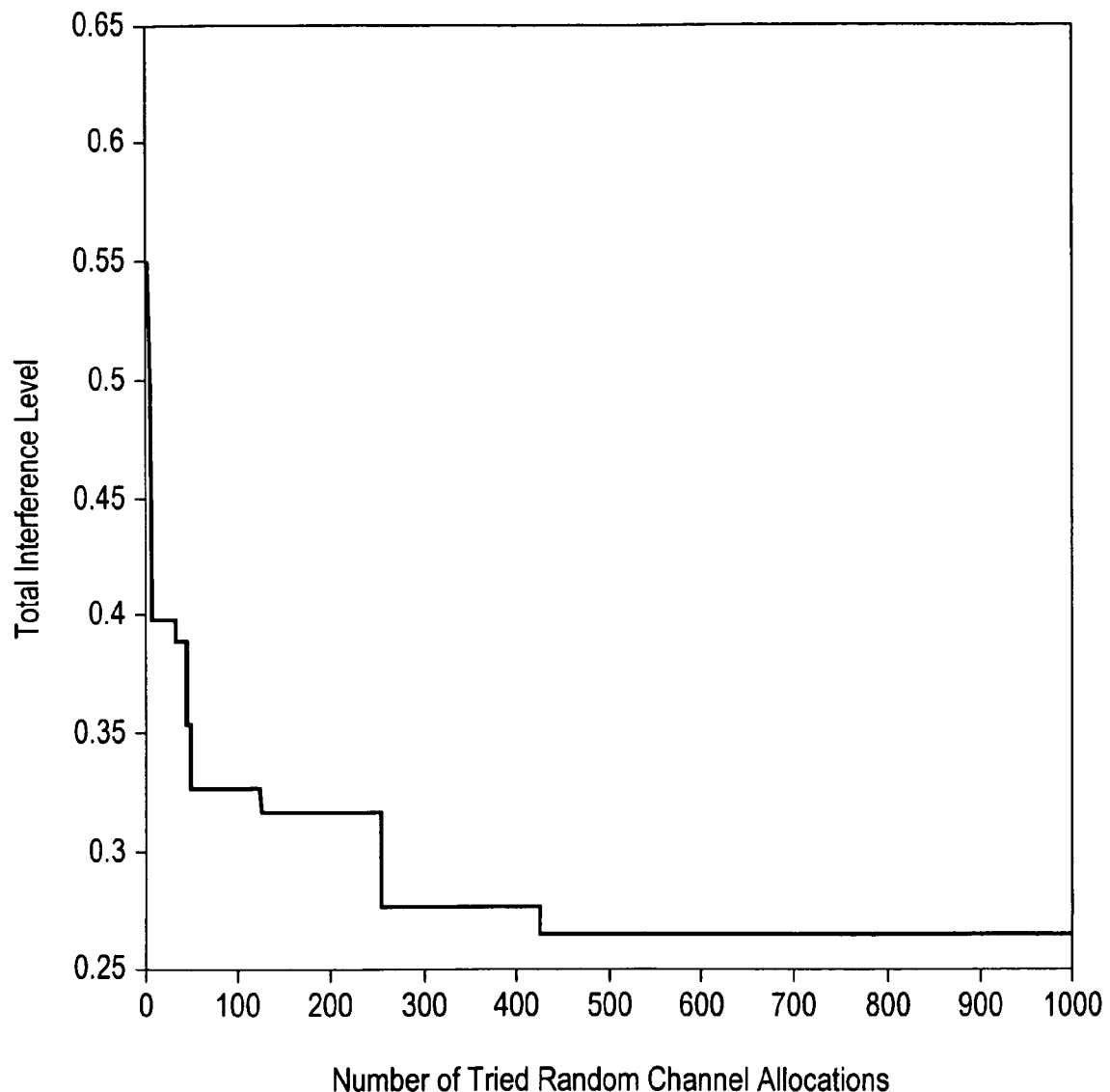
FIG. 25 is a graph of a relationship between a number of tried random channel allocations and the total interference level in the simulations depicted in FIGS. 24A and 24B.

In addition, the total interference for a gateway has been monitored versus number of tried channel allocation possibilities. The results in FIG. 25 shows that almost after trying about channel allocation the channel allocation algorithm has managed to converge to a minimum total interference value.

Figure 26A:
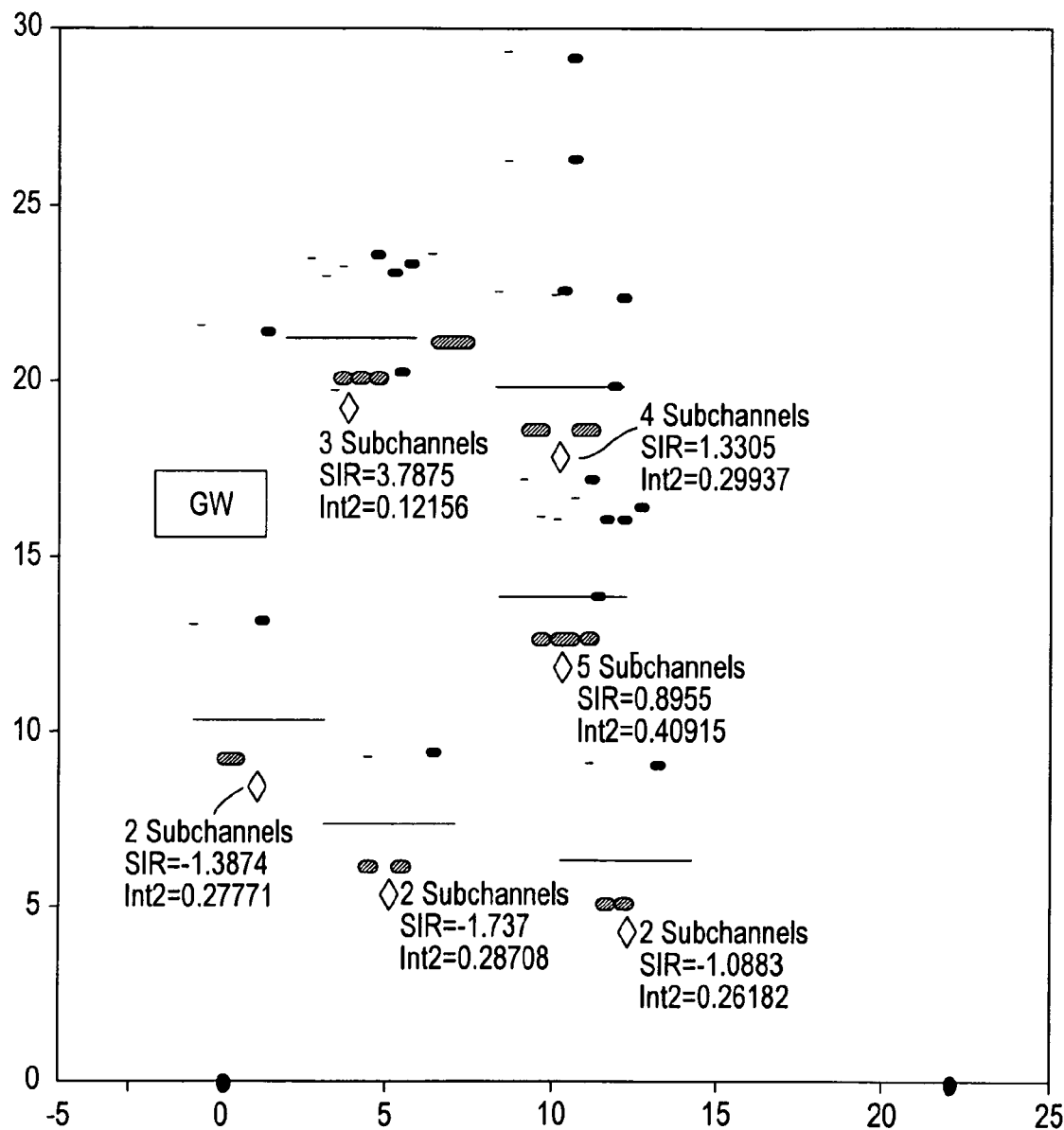
FIGS. 26A and 26B illustrate results of further simulations to evaluate the performance of the second phase of the method embodying the present invention.
Figure 26B:
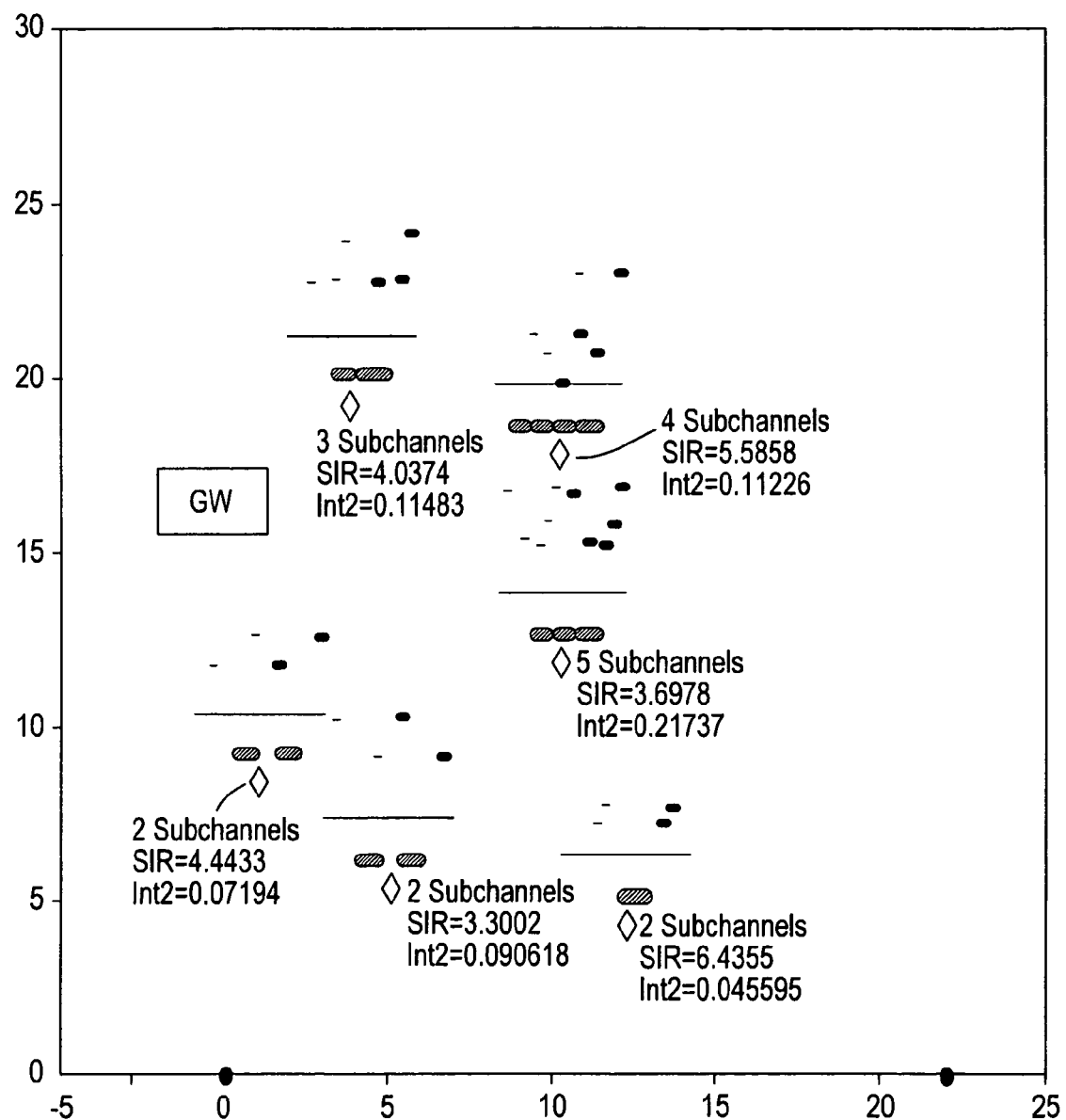
Figure 27:
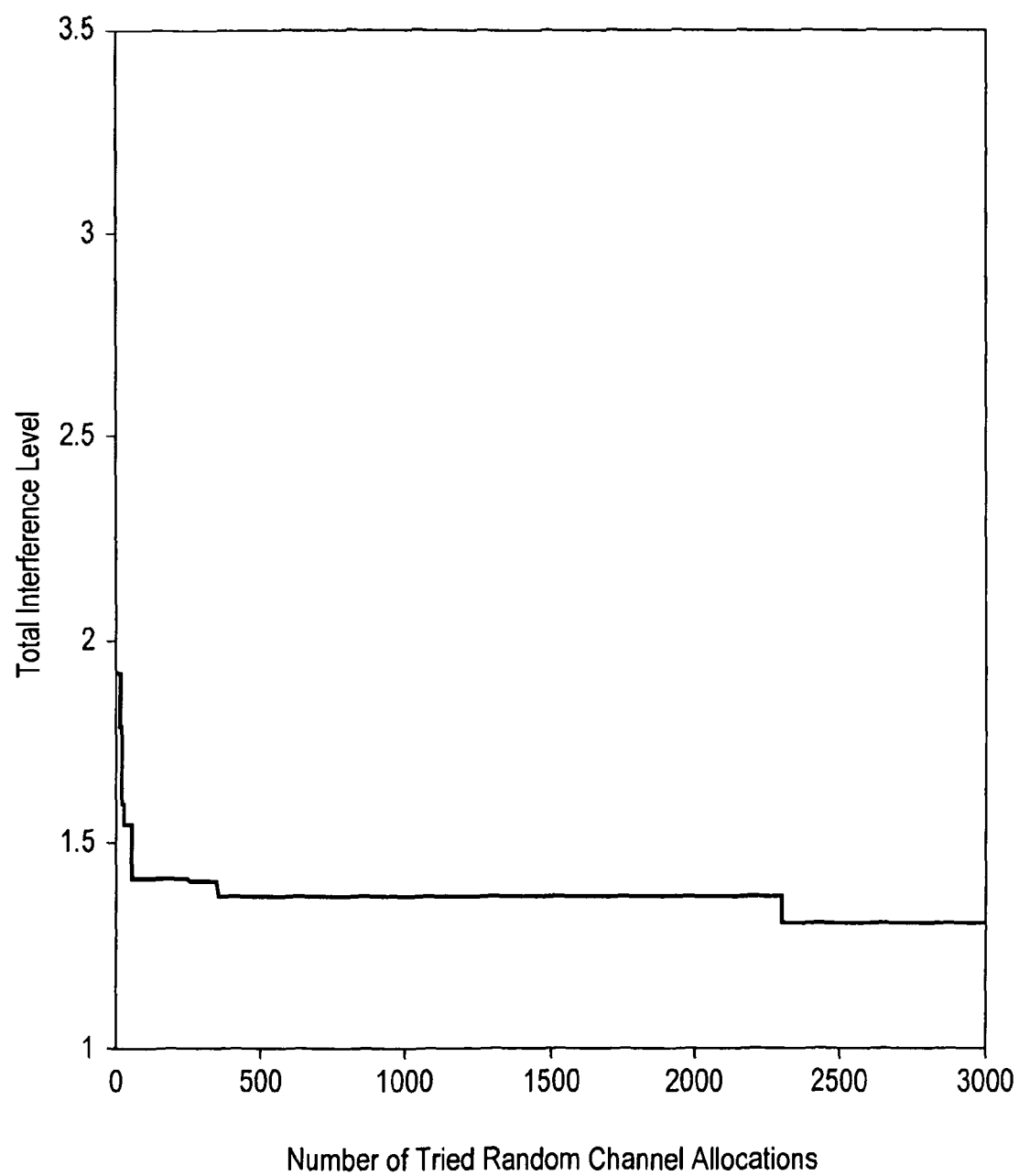
FIG. 27 is a graph of a relationship between number of tried random channel allocations and the total interference level in the simulations depicted in FIGS. 26A and 26B.

In FIGS. 26A and 26B, another potential scenario is presented. Finally, FIG. 27 is a graph corresponding to FIG. 25, of total interference level against the number of allocation attempts made at random, showing that a significant reduction of interference for a cluster of transceivers is observed at the sub-channel level.

To summarise, a method embodying the present invention is an interference mitigation method in a wireless network in which a plurality of nodes share an available frequency spectrum by performing wireless communication on sub-channels defined within the available spectrum. The nodes are grouped into clusters, each cluster having a leader of the cluster. The leaders are in communication with a network manager or gateway of the network. Preferably, every node in the cluster is a transceiver equipped to act as leader and this leader role is rotated around the cluster. The present invention also embraces a wireless network practising the method, as well as a transceiver or network manager in the network.

A first possible phase of the method is a distributed or cluster-wide sub-channel allocation, performed on short time scales. For each cluster in turn, the leader finds a required number of sub-channels for its wireless communication. Then it monitors all the sub-channels to obtain a received interference level representing interference received from the other nodes on each of the sub-channels, and determines possible combinations of sub-channels for its own use, taking into account the interference levels found. Next, the leader determines (for example, by sending a test signal and requesting other nodes to provide the results) an inflicted interference level expected to be caused to the other nodes by some of the possible combinations of sub-channels, which may for example be tried at random. One of the combinations of sub-channels is then adopted, based on the received interference level and the inflicted interference level. Control then passes to another node in the cluster (for example by making it the new leader) and, if all nodes in one cluster have had their turn, the same process takes place in another cluster.

The method further allows clusters to co-operate without necessarily involving central control by the network manager. The leader monitors the overall interference level in the cluster, and if this exceeds a first threshold, it requests the leader of another cluster to merge their clusters in an attempt to reduce the interference level in the merged cluster below the first threshold. The process outlined above can be repeated on the enlarged cluster with some prospect of an improved result. Conversely, if the interference level falls below a second threshold, the leader may attempt to divide its cluster into two, and designate another node as the leader of one of the divided clusters. Finally, if an attempt to reduce interference by merger is not successful, the leader may request a network manager to intervene.

Thus, in a second possible phase of the method, the network manager performs a centralized or network-level interference mitigation process by coordinating sub-channel allocation among the clusters. In this centralized approach, the network manager captures information from the nodes such as buffer occupancy, transmission power and path loss between nodes, to determine possible sub-channel allocations for each cluster. These are then distributed to the nodes or to leader nodes as suggestions for use as a starting point for subsequent semi-distributed sub-channel allocation.

The present invention avoids the need for a permanent central entity for interference management and dynamic channel allocations, whilst permitting a central entity (gateway) to intervene when required. It captures some features and advantages of cognitive radio while also enjoying the advantages of traditional radio communication. Namely, the transceiver (for example, the current cluster leader) which is currently responsible for the major part of the channel allocation process, in one phase partially acts as a cognitive radio when listens to sub-channels to come up with the best sub-channel combination for future transmission. However in a cooperative manner the transceiver also has an eye on what is happening to other cluster members which is a feature of traditional radio communication. As a result the process can be seen as a cooperative approach.

The feature of rotating the leader role in the first phase noted above realizes a fair cluster wide dynamic interference management and channel allocations. It proposes the concept of red (i.e. high interference) and cold (i.e. low interference) clusters in a wireless network and, moreover, the concept of merging red and cold clusters.

In one particular embodiment, the present invention adopts, in the above first phase, a novel ten step procedure for distributed dynamic channel allocations. Novel signalling between potential existing clusters is provided, for example when merging clusters.

By causing a problem arising at a local (cluster) level to involve a central entity (network manager or gateway), the present invention introduces the concept of triggering the centralized interference reduction mechanism by (short term and long term) decentralized spectrum assignment processes. The trigger may be provided by a red cluster (i.e. cluster hit by high interference) being unable find further clusters with which to merge.

In short, the method or network embodying the present invention provides a combination of semi-distributed and centralized gateway-controlled fast and dynamic radio channel allocation and interference mitigation techniques, suitable for use in a wireless network involving a gateway or a centralized RRM entity as a network manager. A WINNER network is one example of such a network.

A method or network embodying the present invention may provide several advantages as follows.

There is no need for the expensive (bandwidth-hungry) signalling associated with purely-centralized channel allocations. It reduces the burden on a central entity of managing the interference. It exploits the fast variations of radio channel and traffic load in order to have a better and more efficient dynamic interference management and radio channel allocations, leading to overall interference reduction in the network. Use of the invention may help to avoid the potential collision of interests in a dynamic radio channel allocation process involving multiple transceivers, providing a further fine tuning to short term spectrum assignment.

By practising the invention it may be possible simultaneously to improve overall radio sub-channel utilization while universally improving the interference level. This in turn can be expected to improve the QoS, the overall network coverage and throughput. The feature of merging red and cold clusters makes it possible to make the "well doing" clusters aware of the "troubled" clusters in terms of interference management (cluster of UEs or cluster of BSs). Performing a joint channel allocation for the merged cluster in effect forces the nodes to be considerate to each other in making the sub-channel allocation decisions. As a result the nodes in the former cold cluster may reduce their interference on the former red cluster leading to interference reductions all over the merged cluster. In this way, the pattern of fairness can be made to propagate to all the multiple clusters present in a wireless network without a need for a watching central entity.

Meanwhile, occasional activation and triggering of methods for a centralized gateway controlled fast and dynamic radio channel allocation provides an efficient initial sub-channel allocation or a proper starting point for the upcoming distributed dynamic interference mitigation and sub-channel allocations. Such centralized gateway control alleviates the weaknesses of distributed interference mitigation and dynamic channel allocations. It exploits the fast variations of radio channel and traffic load in order to have better and more efficient interference mitigation and more efficient dynamic radio channel allocations leading to significant interference reduction all over the network. Centralised control can thus be imposed as occasion demands to overcome the potential collision of interests in a distributed interference mitigation and dynamic radio channel allocation process involving multiple transceivers.

In any of the above aspects, the various features may be implemented in hardware, or as software modules running on one or more processors. In particular, whilst the gateway is depicted in the Figures as a single unit for convenience, the functionality of the GW may be distributed over different locations in the network. For example, certain functions of the GW could be implemented at the level of the BS or spectrum manager. Likewise, the spectrum manager need not be a single unit but may be distributed, for example partly or wholly within the GWs of each wireless network.

Although the above description refers to base stations for convenience, the present invention is not restricted to wireless networks having distinct base stations as such. It may also be applied to networks in which the functions of base stations are handled in other equipment such as UTs, or in wireless sensor networks (WSNs) such as RFID networks and BANs as already mentioned.

Figure 28:
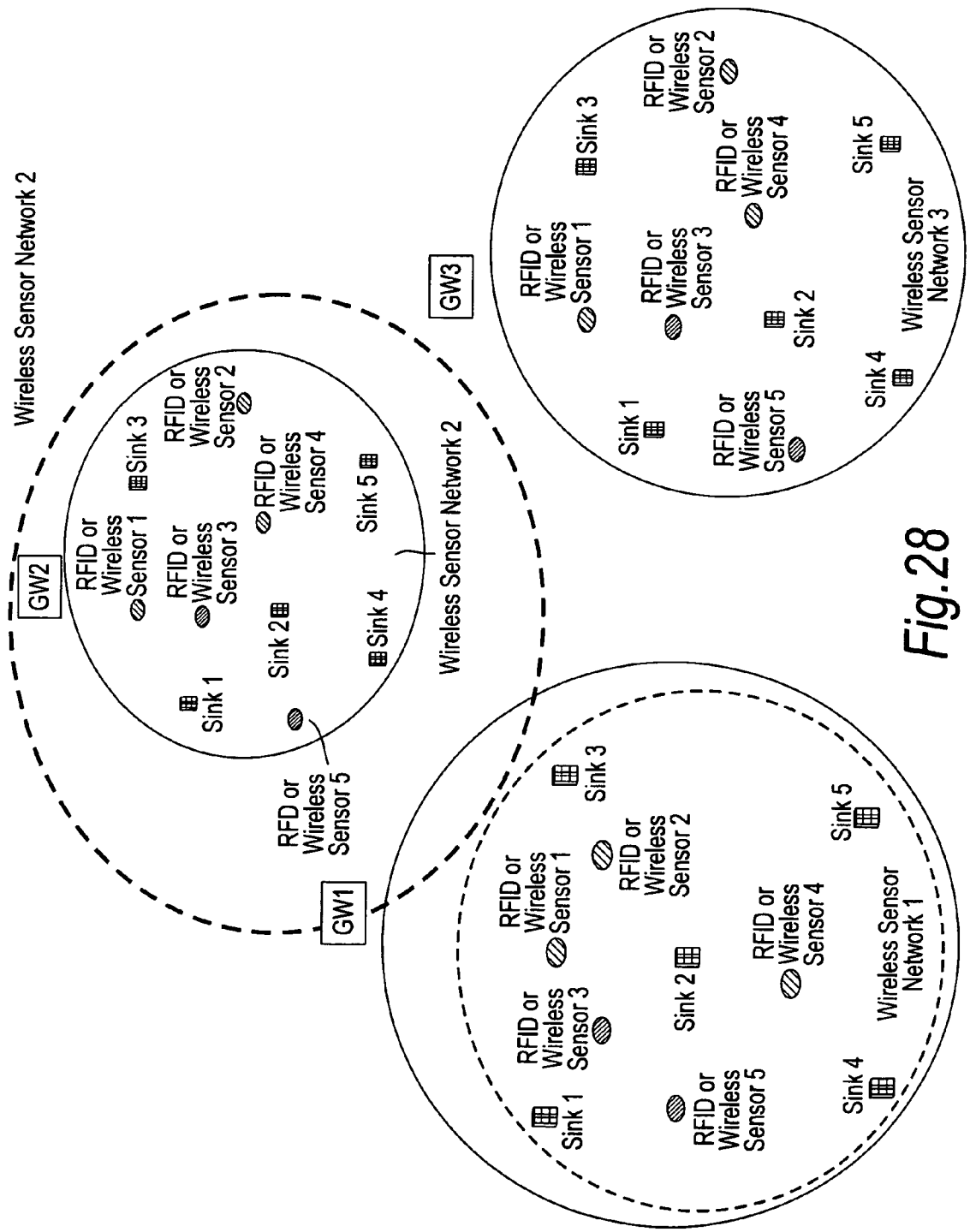
FIG. 28 is a schematic diagram of a wireless sensor network as an alternative type of wireless network to which the present invention may be applied.

FIG. 28 shows an example of three such WSNs (Wireless Sensor Network 1, 2 and 3) each having its own gateway GW1, GW2 and GW3, each with respective RFID or wireless sensors (roughly equivalent to UEs in a wireless communication system) and sinks Sink 1, Sink 2, etc (roughly equivalent to base stations in a wireless communication system)

Features of one aspect may be applied to any of the other aspects. In particular, the claimed wireless network, network manager and base station may have any or all of the features of the method claims.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

What is claimed is:

1. An interference mitigation method for use in a wireless network having a plurality of nodes grouped into a plurality of clusters, the wireless network having a frequency spectrum divisible into a plurality of sub-channels, the sub-channels capable of being allocated in any desired combination for used in wireless communication by the nodes; the method comprising the steps of:
   (a) selecting one of the clusters;
   (b) selecting one of the nodes in the selected cluster;
   (c) the selected node in the selected cluster finding a required number of sub-channels for its wireless communication;
   (d) the selected node monitoring the sub-channels to obtain a received interference level representing interference received from the other nodes on each of the sub-channels, and determining at least one combination of sub-channels in said required number based on the received interference level;
   (e) said selected node obtaining an inflicted interference level representing interference expected to be caused to the other nodes by its use of said combination of sub-channels;
   (f) said selected node deciding whether or not to adopt for its wireless communication the combination of sub-channels based on the received interference level and the inflicted interference level;
   (g) if there is another node in the selected cluster which has yet to be selected, returning to step (b) to select another one of the nodes; and
   (h) if all the nodes in the selected cluster have been selected, returning to step (a) to select another one of the clusters.

2. The interference mitigation method according to claim 1 wherein step (e) comprises said first node sending a test signal over the wireless network and the other nodes measuring interference caused by the test signal, to generate the information on interference they experience on said combination of sub-channels.

3. The interference mitigation method according to claim 2 wherein the other nodes send the information on interference they experience individually to the selected node and the selected node obtains the inflicted interference level by collating this information.

4. The interference mitigation method according to claim 1 wherein step (f) comprises deciding to adopt the combination of sub-channels based on whether the received interference level and inflicted interference level obtained in steps (d) and (e) are within a specified margin relative to a previously-stored received interference level and inflicted interference level, and if said combination of sub-channels is adopted, the selected node storing the newly-obtained received interference level and inflicted interference level in place of the previously-stored values.

5. The interference mitigation method according to claim 1 wherein in step (c), if the required number of sub-channels does not exceed an existing number of sub-channels already being used by the selected node, steps (d) to (f) are skipped and the selected node adopts for its wireless communication a combination of said existing number of sub-channels or fewer.

6. The interference mitigation method according to claim 1 wherein in step (d), the selected node determines said combination of sub-channels by measuring the received interference level on a plurality of possible combinations of sub-channels of said required number and finding the combination which minimises the received interference level.

7. The interference mitigation method according to claim 1 wherein in step (d), the selected node determines said combination of sub-channels by measuring the received interference level on a plurality of possible combinations of sub-channels of said required number and ranking the possible combinations in order of least received interference level.

8. The interference mitigation method according to claim 1 wherein step (h) further comprises determining an overall interference level in the cluster after all the nodes have been selected, said overall interference level being determined by a leader node of the cluster which, if it determines that the overall interference level exceeds a first predetermined threshold, informs other clusters in the network of an interference-critical state.

9. The interference mitigation method according to claim 8 further comprising said leader node requesting the leader node of another cluster to merge their respective clusters and then performing the interference mitigation method on the basis of the merged cluster jointly.

10. An interference mitigation method in a wireless network in which a plurality of nodes share an available frequency spectrum by each performing wireless communication using one or more sub-channels defined within the available spectrum, the nodes being grouped into clusters, each cluster having a node designated as the leader of the cluster and associated nodes in communication with the leader, the method comprising:
   the leader of each cluster monitoring an interference level in its cluster, said interference arising at least partly from nodes in the cluster using the same sub-channels;
   if the interference level exceeds a predetermined first level in any said cluster, the leader thereof requesting the leader of another cluster to merge their respective clusters for the purpose of reducing the interference level in the merged cluster below the first level; and
   if the interference level is below a predetermined second level in any said cluster, the leader thereof dividing its cluster into two clusters and designating one of the associated transceivers as the leader of one of the divided clusters.

11. An interference mitigation method in a wireless network in which a plurality of nodes share an available frequency spectrum by each performing wireless communication using one or more sub-channels allocated to them within the available spectrum, the nodes being grouped into clusters, each cluster having a node designated as the leader of the cluster and which is in communication with a network manager of the wireless network, the method comprising the steps of:
   (a) the leader of each cluster monitoring an interference level in its cluster, said interference arising at least partly from nodes in the cluster using the same sub-channels for wireless communication;
   (b) if the interference level exceeds a predetermined level in any said cluster, the leader thereof attempting to reduce the interference by communicating with the leader of one or more of the other clusters;
   (c) if the interference level still exceeds the predetermined level after step (b), the leader requesting the network manager to perform a centralized interference mitigation process by co-ordinating sub-channel allocation in the clusters.

12. The interference mitigation method according to claim 11 wherein step (c) comprises steps of:
   (c)(i) the network manager requesting information on a data requirement for wireless communication of each node in each cluster;

(c)(ii) the network manager obtaining a possible sub-channel allocation for each node based on its data requirement;

(c)(iii) the network manager combining the possible sub-channel allocations into a plurality of potential sub-channel combinations, estimating an interference level resulting from each such combination, and selecting the combination for which the estimated interference level is a minimum; and (c)(iv) the network manager informing the leaders of the selected combination of sub-channels.

13. A wireless network having a plurality of transceivers grouped into a plurality of clusters, the wireless network having a frequency spectrum divisible into a plurality of sub-channels, the sub-channels capable of being allocated in any desired combination for used in wireless communication by the transceivers; wherein the network includes selecting means for selecting, in turn, each of the clusters and each of the transceivers within each cluster, each transceiver being provided with control means operable for:

(a) determining that the transceiver is a member of a currently-selected one of the clusters;

(b) determining that the transceiver is a currently-selected one of the transceivers in the selected cluster;

(c) finding a required number of sub-channels for its wireless communication;

(d) monitoring the sub-channels to obtain a received interference level representing interference received from the other transceivers on each of the sub-channels, and determining at least one combination of sub-channels in said required number based on the received interference level;

(e) obtaining an inflicted interference level representing interference expected to be caused to the other transceivers by its use of said combination of sub-channels; and (f) deciding whether or not to adopt for its wireless communication the combination of sub-channels based on the received interference level and the inflicted interference level.

14. A wireless network in which a plurality of transceivers share an available frequency spectrum by each performing wireless communication using one or more sub-channels defined within the available spectrum, the transceivers being grouped into clusters, each cluster having a transceiver designated as the leader of the cluster and associated transceivers in communication with the leader, wherein each transceiver comprises:

monitoring means responsive to the transceiver being designated as the leader to monitor an interference level in its own cluster, said interference arising at least partly from transceivers in the cluster using the same sub-channels;

comparing means for comparing the interference level with a predetermined first level and a predetermined second level, and for, if said predetermined first level is exceeded, declaring an high-interference state of the cluster, and if the predetermined second level is not exceeded, declaring a low-interference state of the cluster; and signalling means responsive to said high-interference state to request the leader of another cluster to merge their respective clusters for the purpose of reducing the interference level in the merged cluster below the first level, and responsive to said low-interference state to request another transceiver of its own cluster to become leader of a new cluster de-merged from its own cluster.

15. A wireless network in which a plurality of nodes share an available frequency spectrum by each performing wireless communication using one or more sub-channels allocated to them within the available spectrum, the nodes being grouped into clusters, each cluster having a node designated as the leader of the cluster and which is in communication with a network manager of the wireless network, wherein:

the leader node in each cluster comprises monitoring means for monitoring an interference level in its cluster, said interference arising at least partly from nodes in the cluster using the same sub-channels for wireless communication; comparing means for comparing the interference level so monitored with a predetermined level; cluster coordination means for coordinating spectrum allocation with one or more of the other clusters if the comparing means determines that the cluster is in an interference state in which the monitored interference level exceeds said predetermined level; and requesting means for signalling the network manager to request centralized interference mitigation in the event that the coordination means fails to resolve the interference state; and the network manager comprises control means for performing a centralized interference mitigation process by co-ordinating sub-channel allocation among the clusters to resolve said interference state.

16. A transceiver for use in a wireless network in which a plurality of transceivers share an available frequency spectrum by each performing wireless communication using one or more sub-channels defined within the available spectrum, the transceivers being grouped into clusters, each cluster having a transceiver designated as the leader of the cluster and associated transceivers in communication with the leader, wherein the transceiver comprises:

monitoring means responsive to the transceiver being designated as the leader to monitor an interference level in its own cluster, said interference arising at least partly from transceivers in the cluster using the same sub-channels;

comparing means for comparing the interference level with a predetermined first level and a predetermined second level, and for, if said predetermined first level is exceeded, declaring an high-interference state of the cluster, and if the predetermined second level is not exceeded, declaring a low-interference state of the cluster; and signalling means responsive to said high-interference state to request the leader of another cluster to merge their respective clusters for the purpose of reducing the interference level in the merged cluster below the first level, and responsive to said low-interference state to request another transceiver of its own cluster to become leader of a new cluster de-merged from its own cluster.

17. A network manager for use in a wireless network in which a plurality of nodes share an available frequency spectrum by each performing wireless communication using one or more sub-channels allocated to them within the available spectrum, the nodes being grouped into clusters, each cluster having a node designated as the leader of the cluster and which is in communication with a network manager of the wireless network, wherein:

the leader node in each cluster comprises monitoring means for monitoring an interference level in its cluster, said interference arising at least partly from nodes in the cluster using the same sub-channels for wireless communication; comparing means for comparing the interference level so monitored with a predetermined level;

cluster coordination means for coordinating spectrum allocation with one or more of the other clusters if the comparing means determines that the cluster is in an interference state in which the monitored interference level exceeds said predetermined level; and requesting means for signalling the network manager to request centralized interference mitigation in the event that the coordination means fails to resolve the interference state; and the network manager comprises control means for performing a centralized interference mitigation process by co-ordinating sub-channel allocation among the clusters to resolve said interference state.

18. A computer-readable medium on which is recorded software which, when executed on a processor of a wireless communications device, provides controlled instructions to control a transceiver for use in a wireless network in which a plurality of transceivers share an available frequency spectrum by each performing wireless communication using one or more sub-channels defined within the available spectrum, the transceivers being grouped into clusters, each cluster having a transceiver designated as the leader of the cluster and associated transceivers in communication with the leader, wherein the transceiver comprises:

monitoring means responsive to the transceiver being designated as the leader to monitor an interference level in its own cluster, said interference arising at least partly from transceivers in the cluster using the same sub-channels;

comparing means for comparing the interference level with a predetermined first level and a predetermined second level, and for, if said predetermined first level is exceeded, declaring an high-interference state of the cluster, and if the predetermined second level is not exceeded, declaring a low-interference state of the cluster; and signalling means responsive to said high-interference state to request the leader of another cluster to merge their respective clusters for the purpose of reducing the interference level in the merged cluster below the first level, and responsive to said low-interference state to request another transceiver of its own cluster to become leader of a new cluster de-merged from its own cluster.

* * * * *